United States Patent [19]
Mine

[11] Patent Number: 5,497,325
[45] Date of Patent: Mar. 5, 1996

[54] SUSPENSION CONTROL SYSTEM FOR A VEHICLE

[75] Inventor: Atsushi Mine, Tokyo, Japan

[73] Assignee: Fuji Jukogyo Kabushiki Kaisha, Tokyo, Japan

[21] Appl. No.: 193,552

[22] Filed: Feb. 8, 1994

Related U.S. Application Data

[63] Continuation-in-part of Ser. No. 97,233, Jul. 27, 1993, abandoned.

[30] Foreign Application Priority Data

Aug. 31, 1992 [JP] Japan ................................. 4-255581
Sep. 29, 1992 [JP] Japan ................................. 4-283707

[51] Int. Cl.⁶ .............................................. B60G 17/015
[52] U.S. Cl. ................................... 364/424.05; 280/707
[58] Field of Search ...................... 364/424.05; 280/707, 280/840

[56] References Cited

U.S. PATENT DOCUMENTS

| | | | |
|---|---|---|---|
| 4,967,359 | 10/1990 | Sugasawa et al. | 280/707 |
| 5,134,566 | 7/1992 | Yokoya et al. | 280/707 |
| 5,142,477 | 8/1992 | Tsutsumi et al. | 280/707 |
| 5,243,525 | 9/1993 | Tsutsumi et al. | 364/424.05 |
| 5,322,319 | 6/1994 | Tanaka et al. | 364/424.05 |
| 5,347,457 | 9/1994 | Tanaka et al. | 364/424.05 |
| 5,361,209 | 11/1994 | Tsutsumi | 364/424.05 |

*Primary Examiner*—Gary Chin
*Attorney, Agent, or Firm*—Beveridge, DeGrandi, Weilacher & Young

[57] ABSTRACT

Suspension system for controlling switching attenuation forces at front wheels and rear wheels. A road surface sensor is provided under a front side of a vehicle body and moves so as to displace a road surface detecting position forwardly of the vehicle body. At the time of an intermediate speed, the road surface sensor itself is displaced forwardly of the vehicle body by an angular displacement apparatus. At the time of a high speed, the road surface sensor itself is further angularly displaced forwardly by an angle variable apparatus in a maximum displacing state to move the road surface detecting position forwardly. A delay time is calculated as required, and an attenuation force switching signal is outputted to the front and rear wheel suspensions, and a timing for at least the front wheel to arrive at the road surface detecting position is always brought substantially into coincidence with the timing for switching the attenuation force of the front wheel suspension by considering the delay time of the control system. Thus, the road surface sensor is suitably displaced and angularly displaced, thereby to optimize detection of a road surface and always switch suspension characteristics relative to a delay of a whole control system at an optimum timing in a whole travel area.

6 Claims, 16 Drawing Sheets

$$\Delta T = \frac{L_o}{V} - \Delta t$$

$$\Delta L = V \cdot \Delta t - L_o$$

SUSPENSION CONTROL SYSTEM FOR A VEHICLE

REFERENCE TO RELATED APPLICATION

This application is a continuation-in-part of my application Ser. No. 08/097233 filed Jul. 27, 1993 now abandoned, the entire disclosure of which is relied upon and incorporated by reference.

BACKGROUND OF THE INVENTION

This invention relates to a suspension control system for a vehicle provided at each wheel for controlling switching of suspension characteristics in response to roughness of a road surface. More particularly, the invention concerns a suspension control system for reliably switching an attenuation force accounting for a delay of a control system over the entire travel conditions.

In general, a suspension system is interposed between a vehicle body and a vehicle wheel with a spring and a shock absorber for absorbing an impact from a road surface by the spring and to attenuate a continuous vibration of its recoiling by the shock absorber, thereby moderating the impact. If the attenuation force of the shock absorber is large, rolling of the vehicle body is suppressed to improve stability of a vehicle attitude, but the shock absorber sensitively reacts to the roughness of the road surface, and hence a stiff riding feel is attained. On the other hand, if the attenuation force is small, the vibration input from the road surface decreases, and a soft riding comfort is obtained. Thus, recently, a semiactive suspension system has been developed in which an attenuation force variable apparatus is added to a shock absorber to control the attenuation force of suspension characteristics in response to good or bad road surface conditions, conditions of braking, starting, turning, etc., to allow steering stability and riding feel to be compatible.

In a control system for switching suspension characteristics dependent on the roughness of a road surface, a road surface sensor of an ultrasonic type for detecting the roughness of a road surface is provided at the front side of a vehicle body. In this case, the road surface sensor is desirably disposed as near as possible to a front wheel so as to decrease detecting error due to pitching of the vehicle body and to detect a road surface.

On the other hand, in the case where the road surface sensor is held fixedly, a period of time when a vehicle wheel actually reaches a road surface detecting position to be detected by the road surface sensor varies in accordance with vehicle speed. Further, a sensor system, a control system, and an actuator system respectively have intrinsic delay times. In the case where the delay time of the whole control system is considered, when the vehicle travels at a predetermined speed or faster, there is no timing margin for road surface information detected by the road surface sensor to be used for controlling switching of the suspension characteristics and to result in no optimum timing of controlling of switching. Therefore, it is always required to so control as to bring the timing for the vehicle wheel to arrive at a road surface detecting position into coincidence with the timing for switching the suspension characteristics by considering the delay time of the whole control system over the whole travel area of the vehicle.

Heretofore, regarding a control system for switching suspension characteristics dependent on the roughness of a road surface, there is prior art as disclosed, for example, in Japanese Patent Laid-Open Publication No. 182825/1991. In the prior art, a road roughness sensor is provided at a lower front end of a vehicle body, and suspension characteristics are switched based on an output of the sensor.

In this prior art, the road surface roughness sensor is fixedly provided at a vehicle body to always detect a road surface separately at a predetermined distance forwardly of its front wheel. Therefore, it cannot control switching of the suspension characteristics at an optimum timing due to the time delay of the whole control system when running at high speed.

If the attenuation force of the shock absorber is large in the suspension, vibration can be rapidly attenuated to decrease changes in the attitude of the vehicle to improve steering stability. On the other hand, if the attenuation force is small, the vibration is continued to improve riding feel. Thus, recently, an attenuation force variable apparatus has been added to a shock absorber to control the attenuation force of suspension characteristics in response to good and bad road surface conditions, states of braking, starting, turning, etc., to provide compatibility of steering stability and riding feel.

In a stable attitude control for changing suspension characteristics depending on roughness of a road surface, a road surface sensor of an ultrasonic type for detecting roughness of the road surface is provided at the front of a vehicle body. In this case, the road surface sensor is desirably disposed as near as possible to a front wheel so as to decrease detecting error due to pitching of the vehicle body and so positioned as to detect the road surface. In the control system, the signal from the road surface sensor is inputted, processed in the control system, and actuated for the actuator of the attenuation force variable apparatus of the suspension.

Therefore, a sensor system, a control system, and an actuator system respectively have delay times. In the case where the sensor mounted position near the front wheel and the delay time of the whole control system are considered, there is no timing margin for road surface information detected by the road surface sensor to be used for controlling switching of the suspension characteristics and therefore no optimum timing of controlling switching is achieved. Thus, it is required to so control as to bring the timing for the vehicle wheel to arrive at a road surface detecting position into coincidence with the timing for switching the suspension characteristics by considering the delay time of the whole control system in the wide vehicle speed range of the vehicle. When four-wheeled suspensions are simultaneously controlled, it cannot be applied in the case where the roughness of the road surface occurs in a short period. Thus, it is necessary to control the suspensions in coincidence with the timing for the front and rear wheels to arrive at the rough road surface.

SUMMARY OF THE INVENTION

Accordingly, an object of this invention is to provide a suspension control system for a vehicle with a suitably angularly positioned road surface sensor thereby to optimize detection of a road surface and which always switches suspension characteristics taking into account the delay of the whole control system at an optimum timing over the entire travel area.

Another object of this invention is to provide a suspension control system for a vehicle in which a road surface sensor is suitably angularly positioned on a vehicle body to optimize detection of a road surface and in which suspension characteristics are always switched at an optimum timing depending on the delay of the whole control system over the entire travel area.

Yet another object of this invention is to provide a suspension control system for a vehicle in which a road surface sensor is suitably located to optimize detection of a road surface and suspension characteristics are always switched at the optimum timing relating to the delay of the whole control system in an entire travel area.

Still another object of this invention is to provide a suspension control system for a vehicle in which suspension characteristics are controlled to be changed by a road surface sensor moveable in a sensor mounted position and by the delay time of the whole control system in a wide vehicle speed range.

Still another object of the invention is to provide a suspension control system for a vehicle which can control change of suspension characteristics in accordance with a road surface sensor in a wide vehicle speed range relative to a sensor mounting position and a delay time of a whole control system and thereby accurately control front and rear wheel suspensions.

In order to achieve the above first object, this invention provides a suspension control system for a vehicle having, a vehicle body and a plurality of vehicle wheels, a suspension interposed between said body and said wheel, a vehicle speed sensor mounted on said vehicle for detecting the speed of said wheel and for generating a vehicle speed signal, a shock absorber with a spring and a variable attenuation system, and an actuator provided in said shock absorber for controlling an attenuation force. A feature of the invention resides in a road surface sensor mounted under a front side of said vehicle body for detecting roughness of a road surface in front of said wheel and for producing a road surface condition signal, a displacement apparatus connected to said road surface sensor for forwardly and rearwardly moving said road surface sensor, an angular displacement apparatus engaged with said displacement apparatus for rotatably changing the angle with respect to said road surface, and control means responsive to said vehicle speed signal and said road surface condition signal for processing and outputting an actuating signal selectively to said displacement apparatus and said angular displacement apparatus without delay and for generating an adjusted attenuation signal so as to enable an optimum control of said suspension and a stable attitude control of said vehicle in any driving condition.

With the above suspension control system, the road surface is accurately detected by the road surface sensor, and an attenuation force of the suspension is controlled to be switched in accordance with road surface information from the road surface sensor. At the time of traveling at a low speed, the road surface sensor is fixed to a shortest position. A delay time depending on the delay of the control system is calculated in this state, and an attenuation force switching signal is output to an actuator after the delay time is elapsed. When the vehicle travels at a higher speed and its front wheels reach road surface detecting positions faster, the road surface itself is displaced forwardly by the displacement apparatus. Or, when the road surface sensor itself is angularly displaced forwardly from the state where the road sensor is directed downwardly by the angular displacement apparatus, and the road surface detecting position is separated forwardly of the vehicle body. Thus, the delay time of the whole control system can be always determined. The delay time is calculated similarly in this sensor actuating state as required to output an attenuation force switching signal to the actuator, thereby always bringing the timing for at least the front wheel to reach the road surface detecting position substantially into coincidence with the timing for switching the attenuation force of the front wheel suspension by considering the delay time of the control system. Thus, a vehicle attitude can be reliably stabilized in the entire travel range.

In order to achieve another object, this invention provides a suspension control system for a vehicle in which an actuation controller for a road surface sensor is hung from a front side of a vehicle body to be operated by an electric signal from a control unit to project forwardly from a position of a shortest front-and-rear distance thereby sequentially displacing the road surface detecting position.

With the arrangement described above, the road surface sensor is mounted by the sensor actuation controller to always accurately detect the road surface forwardly of the front wheels, and attenuation force of the suspension is controlled to be switched in accordance with road surface information of the road surface sensor. Thus, the timing for at least the front wheel to arrive at the road surface detecting position is always brought into coincidence with the timing for switching the attenuation force of the front wheel suspension by considering the delay time of the control system, thereby reliably stabilizing an attitude of the vehicle over the entire travel range.

In order to achieve yet another object, this invention provides a suspension control system for a vehicle having, a vehicle body and a plurality of vehicle wheels, a suspension interposed between said body and said wheel, a vehicle speed sensor mounted on said vehicle for detecting the speed of said wheel and for generating a vehicle speed signal, a shock absorber with a spring and a variable attenuation system, and an actuator provided in said shock absorber for controlling an attenuation force, wherein a feature is a road surface sensor mounted under the front, and preferably at the front side, of said vehicle body for detecting roughness of the road surface in front of said wheel and for producing a road surface condition signal, a displacement apparatus connected to said road surface sensor for forwardly and rearwardly moving said road surface sensor, and control means responsive to said vehicle speed signal and said road surface condition signal for processing and outputting a stepped displacing signal to said displacement apparatus without delay and for generating an adjusted attenuation force switching signal so as to adjust the delay time by a period of time for at least the front wheel to reach the road surface detecting position in response to its vehicle speed and the delay time of a whole control system to output the attenuation force switching signal to the actuator.

With the above suspension control system, the road surface is accurately detected by the road surface sensor, and the attenuation force of the suspension is controlled to be switched in accordance with road surface information from the road surface sensor. At the time of traveling at a low speed, the road surface sensor is fixed to a shortest position. A delay time is calculated by subtracting the delay time of an entire control system from a period of time for the front wheel to reach a road surface detecting position in response to the vehicle speed in this state, and an attenuation force switching signal is output to an actuator after the delay time is elapsed. When the vehicle travels at a higher speed and its front wheels reach at road surface detecting positions faster, the road surface sensor itself is projected stepwisely forwardly of the vehicle body to be positioned forwardly of the vehicle body. Thus, the delay time of the whole control system can be always determined. The delay time is calculated similarly in this sensor actuating state as required to output an attenuation force switching signal to the actuator, thereby always bringing the timing for at least the front wheel to reach the road surface detecting position substantially into coincidence with the timing for switching the attenuation force of the front wheel suspension by considering the delay time of the control system. Thus, a vehicle attitude can be reliably stabilized over the entire travel area.

In order to achieve the still another object, this invention provides a suspension control system for a vehicle having, a vehicle body and a plurality of vehicle wheels, a suspension interposed between said body and said wheel, a vehicle speed sensor mounted on said vehicle for detecting a speed of said wheel and for generating a vehicle speed signal, a shock absorber with a spring and a variable attenuation system, and an actuator provided in said shock absorber for controlling an attenuation force, and wherein a road surface sensor is mounted under the front side of said vehicle body for detecting roughness of the road surface in front of said wheel as to be displaced forwardly from the vicinity of the front wheel to change a road surface detecting position and a control unit for processing signals from the road surface sensor and the travel state to actuate the actuator and a sensor displacing apparatus.

With the arrangement as described above, at the time of a low speed with a time margin for a delay time of the whole control system, the road surface sensor is fixed to the vicinity of the front wheel, the delay time is adjusted by the control unit to output an attenuation force variable signal responsive to the roughness of the road surface to the actuator. Thus, in the case where the wheels reach a projection and a recess in the road, it actuates attenuation so as to suitably change suspension characteristics to control the attitude of the vehicle in a stable manner. At the time of intermediate and high speeds, the road surface sensor is sequentially displaced forwardly to detect the road surface earlier and to output the attenuation force variable signal to the actuator. In this manner, in the case where the wheels reach the projection and the recess, the suspension characteristics can be changed similarly without time delay. Thus, the road surface near the wheels can be accurately detected by the road surface sensor, and the suspension characteristics can be changed without time delay in a wide vehicle speed range.

In order to achieve still another object, this invention provides a suspension control system for a vehicle having, a vehicle body and a plurality of vehicle wheels, a suspension interposed between said body and said wheel, a vehicle speed sensor mounted on said vehicle for detecting a speed of said wheel and for generating a vehicle speed signal, a shock absorber with a spring and a variable attenuation system, and an actuator provided in said shock absorber for controlling an attenuation force, and wherein a road surface sensor is mounted under the front of said vehicle body to move from the vicinity of the front wheel forwardly to change a road surface detecting position for detecting roughness of a road surface in front of said wheel and for producing a road surface condition signal, and control means responsive to said vehicle speed signal and said road surface condition signal for adjusting a delay time or a sensor displacement amount relative to said actuator of said front wheel suspension to output an attenuation force variable signal responsive to roughness of the road surface and adjusting a delay time against said actuator of said rear wheel suspension to output an attenuating force variable signal responsive to roughness of the road surface.

With the above suspension control system, the delay time or the sensor displacement amount is adjusted by the control unit to the actuator of the front wheel suspension to sequentially move the road surface sensor forwardly of the vehicle body to detect the road surface earlier, and an attenuation force variable signal responsive to the roughness of the road surface is outputted, thereby controlling the delay time of the whole control system in a wide vehicle speed range. The delay time considered for a wheel base by the control unit is delayed to the actuator of the rear wheel suspension, and the attenuation force variable signals responsive to the roughnesses of the road surface are respectively outputted. Thus, even if the front wheels have moved to the next rough surface in the road, the suspension actuates the attenuation to suitably change the suspension characteristics similarly to those of the front wheels if the rear wheels reach the rough surface, thereby reliably controlling the attitude of the vehicle in a stable manner.

The nature, utility, and further features of the invention will be more clearly apparent from the detailed description with respect to preferred embodiments of the invention when read in conjunction with the accompanying drawings, briefly described below.

DETAILED DESCRIPTION OF THE INVENTION

Figure 1:
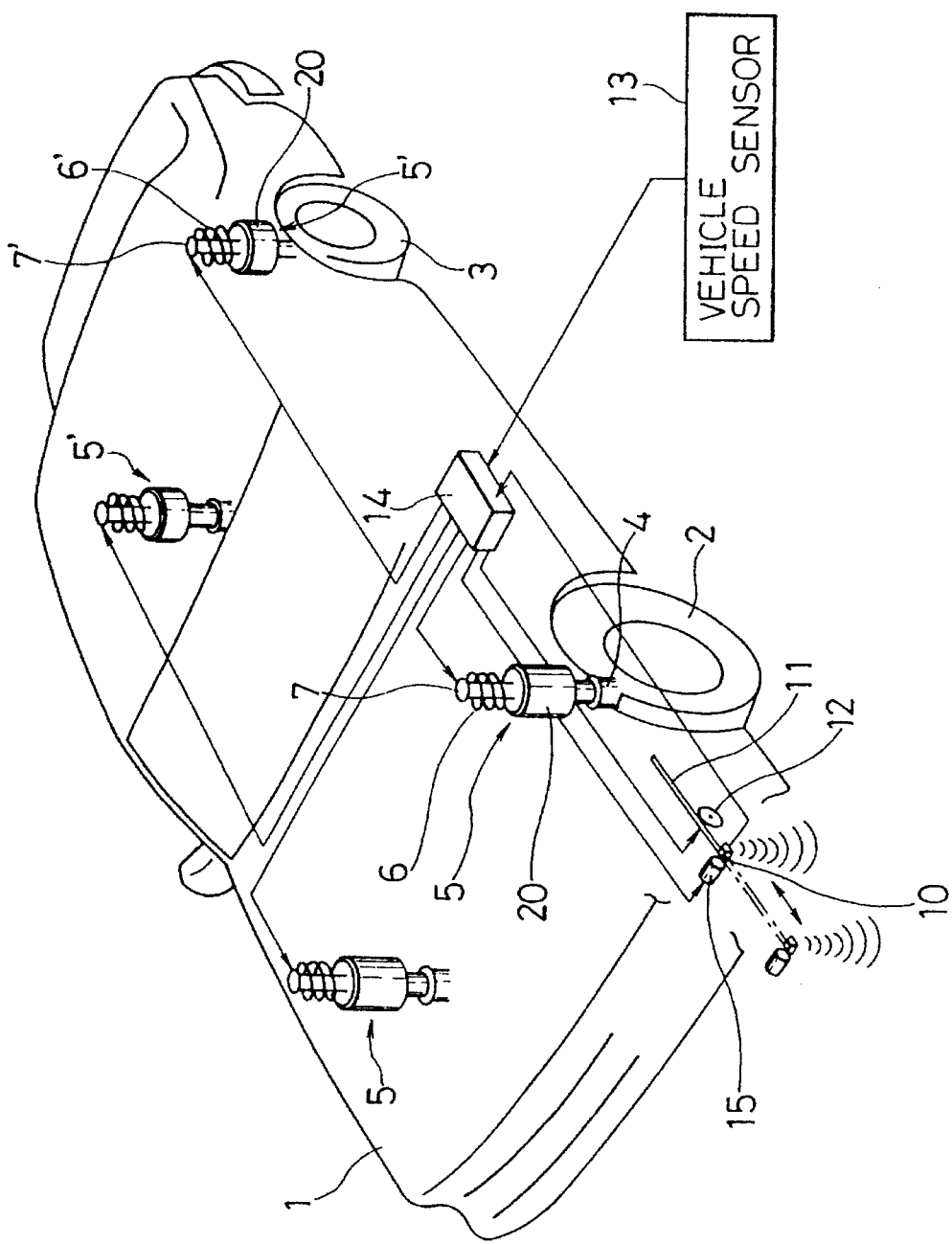
FIG. 1 is a schematic perspective view of an embodiment of an overall suspension control system for a vehicle according to this invention.

The embodiments of this invention will be explained with reference to the accompanying drawings. Referring first to FIG. 1, a suspension control system for a vehicle will be described. Numeral 1 indicates a vehicle body. Suspensions 5 and 5' are respectively interposed between wheel axles 4 of a front wheel 2 and a rear wheel 3 and the vehicle body 1. The front wheel suspension 5 is provided in parallel with an attenuation force variable shock absorber 20 with a spring 6 between the vehicle body 1 and the wheel axle 4, and an electric motor 7 is provided as an actuator for controlling switching of an attenuation force at the upper end of the shock absorber 20. The rear wheel suspension 5' is similar to the front wheel suspension 5, wherein the same components are denoted by the same numerals with "prime", and the description of the operation will be omitted.

A road surface sensor 10 for detecting the roughness of a road surface is mounted in a displacement apparatus 11 having a motor 12 of an actuator and an angular displacement apparatus 15 directly forward of the front wheel 2 of the vehicle body 1. Thus, the road surface sensor 10 is displaced forwardly by the displacement apparatus 11, or inclined forwardly by the angular displacement apparatus 15 to be able to displace its road surface detecting position. Further, a vehicle speed sensor 13 for detecting the travel state of the vehicle is provided. Signals from the road surface sensor 10 and the vehicle speed sensor 13 are inputted to a control unit 14. The motors 7 and 7' of the front and rear wheel suspensions 5 and 5' the displacement apparatus 11 and the angular displacement apparatus 15 are actuated in accordance with the output signal of the control unit 14.

The control unit 14 selects an attenuation force switching signal responsive to road surface information, and further controls an output timing of the attenuation force switching signal relative to the delay of the control system and the road surface detecting position. Its control operation will be described below. If the vehicle speed is designated by V, the delay time of the whole control system by $\Delta t$, the shortest front-and-rear distance between the sensor and a center of a tire by Lo, a sensor horizontal displacement amount of the sensor by $\Delta L1$, and a horizontal displacement amount angularly displaced, i.e., a sensor inclined displacement amount by $\Delta L2$, the whole length to the road surface detecting position in front of the tire is obtained by Lo+$\Delta L1$+$\Delta L2$, the time from the time of detecting the road surface to arrival at the time is obtained by (Lo+$\Delta L1$+$\Delta L2$)/V. A margin time including the delay time $\Delta T$ to be adjusted when the road surface information is used for controlling is obtained by (Lo+$\Delta L1$+$\Delta L2$)/V-$\Delta t$.

Figure 7:
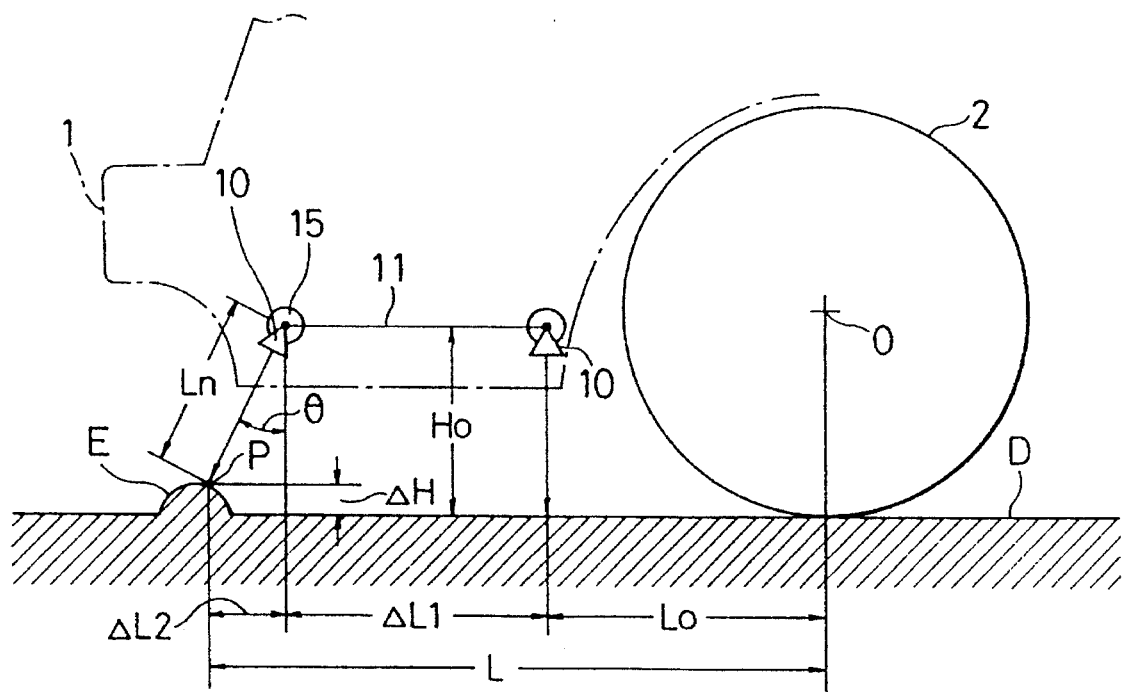
FIG. 7 is an enlarged schematic view showing sensor mounting positions.

Details where the road surface sensor 10 is inclined in front of the vehicle body are shown in FIG. 7. That is, the sensor mounting height is designated by Ho, the sensor inclined angle by $\theta$, the height of the roughness E of the road surface D by $\Delta H$, and the sensor detecting distance by Ln. In this case, at the time of directing the road surface sensor 10 directly downward $\theta$=0, the height of the roughness E of the road surface D is obtained by $\Delta H$=Ln–Ho. In the case of $\theta$>0, $\Delta L2$=Ln·sin $\theta$ and $\Delta H$=Ho–Ln·cos $\theta$ are attained. In this case, the upward direction of the roughness E is positive, and the forward distance is positive. Therefore, at the time of a low speed capable of calculating the delay time, the delay time $\Delta T$ is calculated to be controlled. At the time of an intermediate speed and a high speed, the road surface sensor 10 itself is horizontally displaced and further angularly displaced to so control as to displace the road surface detecting position forwardly of the vehicle body. Thus, the delay time $\Delta t$ of the whole control system can be always determined, and the timing for arriving at least the front wheel 2 at the road surface detecting position can be brought substantially into coincidence with the timing for switching the attenuation force of the front wheel suspension 5 in the whole travel area.

Then, when the vehicle speed V is equal to or lower than a set vehicle speed Vs1 (Lo/$\Delta t$) capable of calculating the delay time, it is assumed to be $\Delta L1$=0=0, and the delay time $\Delta t$ is calculated by $\Delta T$=Lo/V–$\Delta t$, and the height $\Delta H$ of the roughness of the road surface is calculated by $\Delta H$=Ln–Ho to be controlled. At the time of an intermediate speed and a high speed equal to or faster than the set vehicle speed Vs1, a set vehicle speed Vs2 capable of controlling when the sensor is displaced mostly forwardly is set. When the vehicle speed V is equal to or lower than the set vehicle speed Vs2, it is assumed to be $\Delta T$=0=0, and the sensor horizontal displacement $\Delta L1$ is calculated by $\Delta L1$=V.$\Delta t$–Lo, and the height $\Delta H$ of the roughness of the road surface calculated by $\Delta H$=Ln–Ho to be controlled.

Further, when the vehicle speed V is equal to or faster than the set vehicle speed Vs2, $\Delta L$=$\Delta Lmax$ ($\Delta Lmax$ indicates a sensor maximum displacement amount) is set, and the sensor inclined angle $\Delta$ is sequentially increased with margin in response to the acceleration of the vehicle speed V. Then, the sensor inclined displacement $\Delta L2$ amount is calculated by $\Delta L2$=Ln·sin $\theta$. Further, the delay time $\Delta T$ is calculated by $\Delta T$=(Lo–$\Delta Lmax$+$\Delta L2$)/V–$\Delta t$. The height $\Delta H$ of the roughness of the road surface is calculated by $\Delta H$=Ho–Ln·cos $\theta$ to be controlled.

Figure 2:
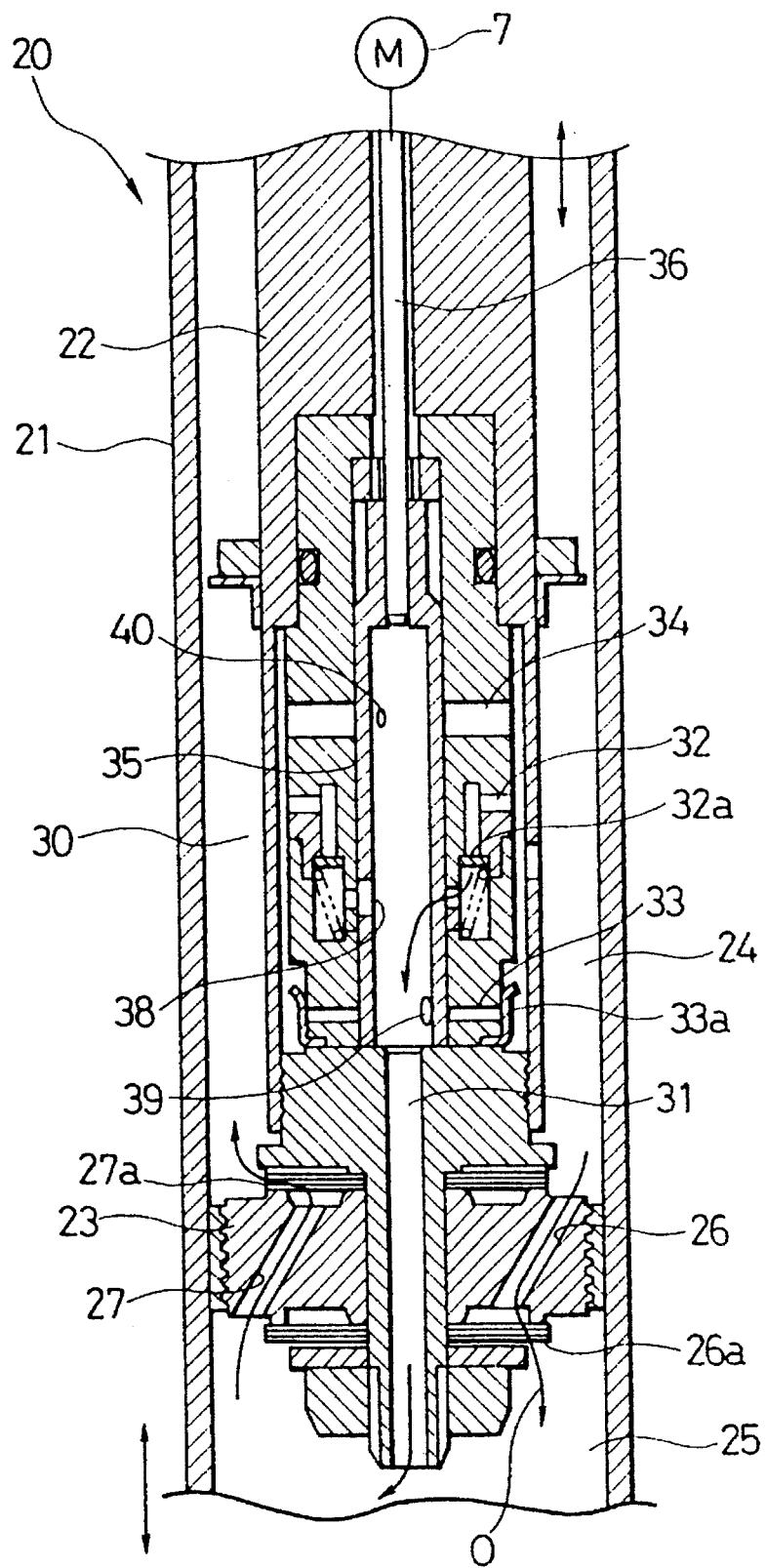
FIG. 2 is a sectional view showing an attenuation force variable shock absorber.

Referring to FIG. 2, an embodiment of an attenuation force variable shock absorber 20 will be described in detail. In the shock absorber 20, a rod 22 with a piston 23 at the side of the vehicle body 1 is movably inserted into a cylinder 21 at the side of the vehicle axle 4. The cylinder 21 is partitioned by the piston 23 into an upper chamber 24 and a lower chamber 25, and oil O is filled in the chambers 24 and 25. The piston 23 is provided with a main passage 25 and a main valve 26a of an extension side and with a main passage 27 and a main valve 27a of an extension side and with a main passage 27 and a main valve 27a of a compression side. When the rod 22 rises to be extended, the one main valve 26a is opened, and the oil O flows from the upper chamber 24 to the lower chamber 25 through the main passage 26. When the rod 23, on the contrary, falls to be compressed, the other main valve 27a is opened, and the oil O flows from the lower chamber 25 to the upper chamber 24 through the main passage 27. In this case, diameters of orifices of the main passages 26 and 27 are set to small values, thereby generating equally hard attenuating forces at both the extension and compression sides.

An attenuation force variable apparatus 30 is provided in the rod 22. The attenuation force variable apparatus 30 is provided with a communication hole 31 at the center of the rod 22 for communicating with its lower chamber 25. The communication hole 31 communicates a subpassage 32 at the extension side with a subvalve 32a, a subpassage 33 at the compression side with a subvalve 33a and with the upper chamber 24 through a subpassage 34 at both the extension and compression sides. A shutter 35 from the motor 7 is rotatably inserted into the communication hole 31 through a connecting rod 36, and three types of holes 38, 39 and 40 are formed at positions angularly displaced at predetermined angles on the circumference of the shutter 35.

Figure 3:
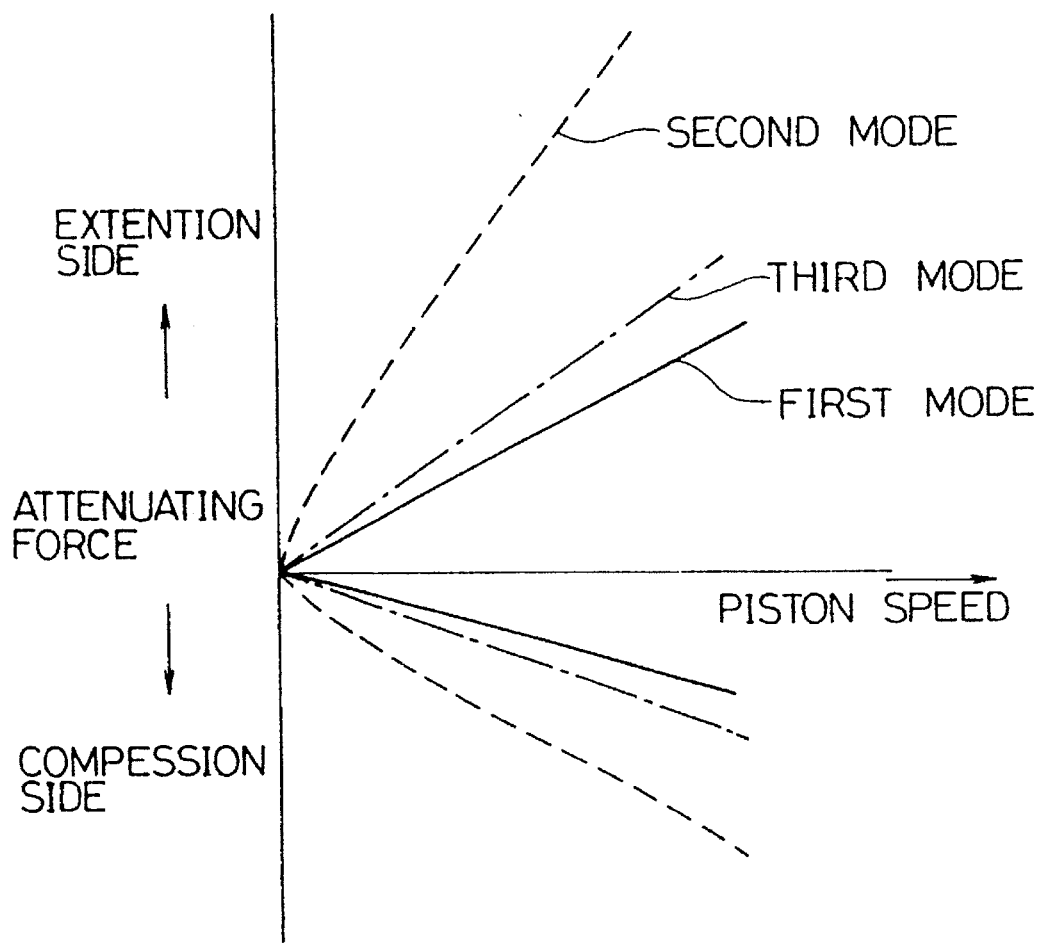
FIG. 3 is a graph indicating attenuating force characteristics of the suspension.

When the shutter 35 is angularly displaced at a predetermined angle by the motor 7 to connect only the hole 38 with the subpassage 32, in the case where the rod 22 falls to be compressed, the subvalve 32a is closed. In the case where the rod 22 rises to be extended, the subvalve 32a is opened, the oil O in the upper chamber 24 flows to the subpassage 32 to increase the diameter of the orifice, thereby obtaining first mode attenuating force characteristics which are soft at the extension side and hard at the compression side as illustrated in FIG. 3. Then, when the other hole 39 connects with the subpassage 33 by the motor 7, the subvalve 33a is also opened to increase the diameter of the orifice only in the case where the rod 22, on the contrary, falls to be compressed. Thus, second mode attenuating force characteristics which are hard at the extension side and soft at the compression side are obtained as illustrated in FIG. 3. Further, when the other hole 40 connects with the subpassage 34 by the motor 7, the oil O always flows to the subpassage 34 to increase the diameter of the orifice, and hence third mode attenuating force characteristics which are slightly soft at both the extension and compression sides are obtained as illustrated in FIG. 3. Thus, three types of the modes of the attenuating force characteristics can be attained by the motor 7.

The operation of this embodiment will be described by referring to the flow chart of FIG. 4. When the vehicle travels, the vehicle speed V is read at step S1. The output Ln of the road surface sensor 10 is read at step S2. Then, the vehicle speed V is compared with the set vehicle speed Vs1 at step S3 to check a travel state. In this case, as practical values, Lo=0.5 m and Δt=0.03 sec. are, for example, employed. Then, Vs1=60 km/hr is obtained.

Figure 5A:
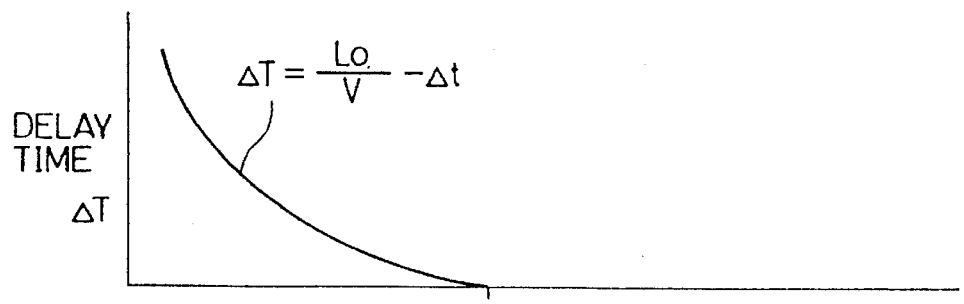
FIGS. 5a through 5c are graphs indicating a delay time, a sensor displacement amount and a sensor inclined angle adjusted state.
Figure 5B:
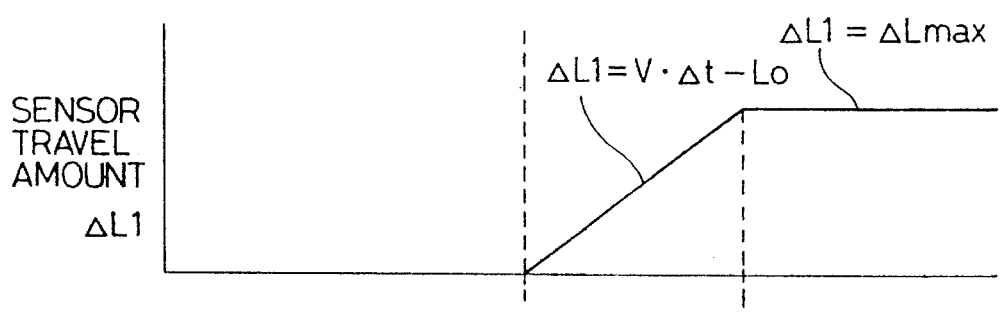

Then, at the time of a low speed equal to or lower than the set vehicle speed Vs1, the flow advances to step S4, the road surface sensor 10 is fixed to the shortest distance in the state directed directly downward by ΔL1=0=0, and the delay time ΔT is calculated at step S4. Then, the delay time ΔT is calculated by subtracting the delay time Δt of the whole control system from the time Lo/V when the front wheel 2 reaches the road surface detecting position (Lo) in response to the vehicle speed V to be adjusted in a decreasing function manner with respect to the vehicle speed V as shown by delay time characteristics in FIG. 5(a). Thus, in the case where the vehicle speed V is low and the front wheel 2 extends relatively slowly to the road surface detecting position of the road surface sensor 10, the delay time ΔT is also increased correspondingly.

Then, at step S5, the height A of the roughness of the road surface is calculated. At step S6, time hysteresis data Δh of the height ΔH of the road surface is formed. At step S7, road surface height information Δh (ΔT) necessary to change the attenuation force this time is calculated depending on the time hysteresis data Δh and the calculating period of a microcomputer. At step S8, attenuating force characteristics adapted for the road surface height information Δh are determined, and the attenuating force switching signal is simultaneously outputted to the motors 7, 7 of the shock absorbers 20, 20' of the front and rear wheel suspensions 5, 5' after the delay time ΔT is elapsed. Then, in the case where the above-described vehicle speed V is low, the attenuation force switching signal is slowly outputted at a longer delay time ΔT, thereby switching the attenuation force variable apparatus 30 of the front wheel suspension 5 to a suitable attenuation force at the optimum timing substantially coincident with the case where at least the front wheels 2 reach the road surface detecting position.

Figure 6:
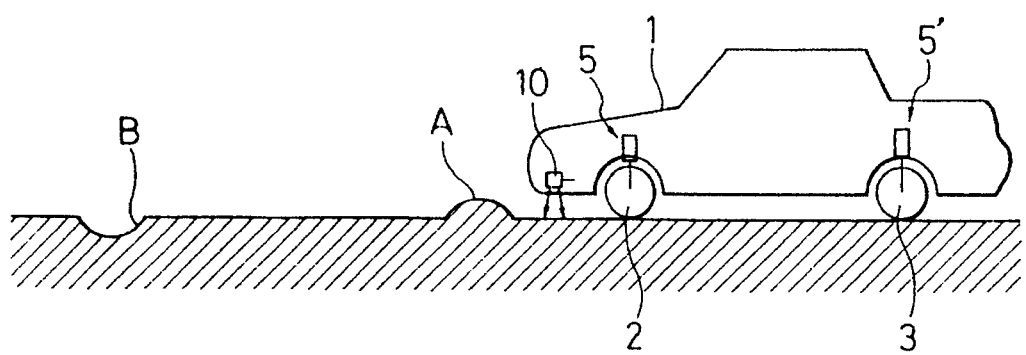
FIG. 6 is a schematic view showing a rough state of a road surface.

As shown in FIG. 6, when the road surface sensor 10 detects a projection A, the attenuation force switching signal of the second mode of FIG. 3 is outputted to the motors 7, 7' and the attenuation force variable apparatus 30 of the front wheel suspension 5 is switched to the characteristics. Thus, in the case where the front wheels 2 actually travel on the protrusion A to move above the protrusion A, the attenuation force variable apparatus 30 actuates the attenuation which is soft at the compression side and hard at the extension side. Then, in the case where the rear wheels 3 travel over the protrusion A, since the rear wheel suspensions 5' are already switched to the same characteristics, the attenuation force variable apparatus 30 similarly actuates the attenuation to suppress the upward movement of the vehicle body 1.

On the other hand, when the road surface sensor 10 detects a recess B, the attenuation force switching signal of the first mode of FIG. 3 is outputted to the motors 7, 7' this time. In the case where the front wheels 2 and the rear wheels 3 actually travel into the recess B to move downwardly, the attenuation force variable apparatus 30 of the front and rear wheel suspensions 5, 5' actuates the attenuation which is soft at the extension side and hard at the compression side to suppress the downward movement of the vehicle body 1. Thus, the vehicle body 1 of the vehicle is reliably controlled to hold an attitude which moves up and down less than the protrusion A and the recess B of the road surface.

Figure 4:
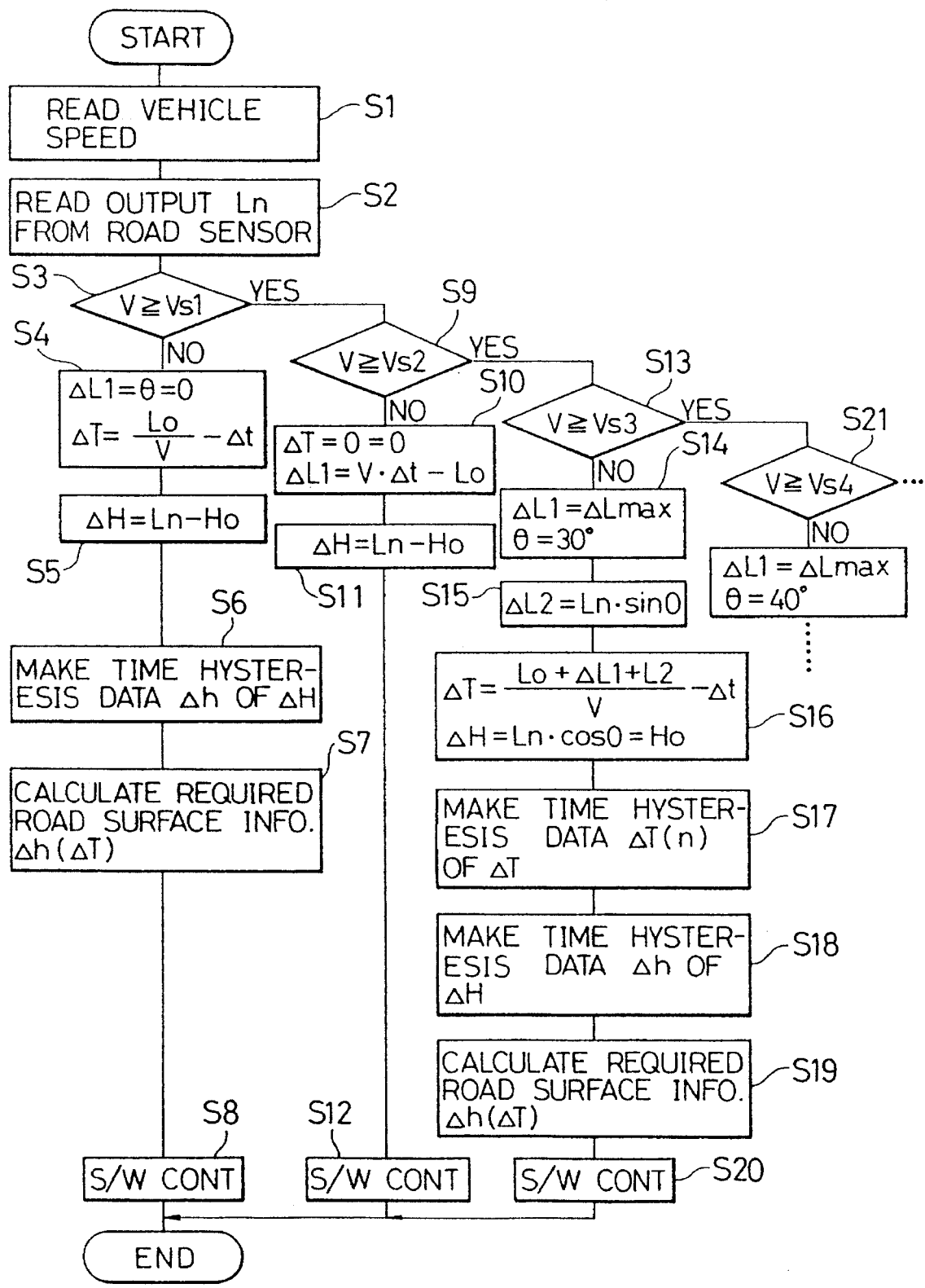
FIG. 4 is a flow chart showing control of changing suspension characteristics in response to the rough state of a road surface.

Then, if the vehicle speed V is accelerated equal to or faster than the set vehicle speed Vs1, the flow advances from the step S3 to step S9 of the flow chart of FIG. 4. At step S9, it is compared with the set vehicle speed Vs2 controllable in the case where the sensor is moved mostly forwardly. In this case, practical values are set to Lo=0.5 m, Δt=0.03 sec. and ΔLmax=0.33 m. Then, Vs2=100 km/hr is attained.

At the time of an intermediate speed equal to or lower than the set vehicle speed Vs2, the flow advances to step S10. At step S10, ΔT=0 is set fixedly. In this case, the sensor horizontal displacement amount ΔL1 is calculated by subtracting the sensor front-and-rear shortest distance Lo from the distance Δ·Δt advancing in response to the vehicle speed V and the delay time ΔT of the whole control system as shown in FIG. 6(b). At step S11, the height ΔH of the roughness of the road surface is calculated similarly to the above. At step S12, the displacement signal is outputted to the displacement apparatus 11. The road surface sensor 10 itself is moved in the state directed directly downwardly, and the road surface detecting position is moved forwardly of the front wheel 2 at the sensor horizontal displacement amount ΔL1.

In the case where the front wheel 2 rapidly reaches the road surface detecting position as the vehicle speed V is accelerated, the road surface position is so controlled by the movement of the road surface sensor 10 itself in response thereto as to be moved forwardly of the vehicle body, thereby always obtaining the delay time Δt of the whole control system. Thus, even if the attenuating force characteristics adapted for the height ΔH of the roughness of the road surface is determined and then the attenuation force switching signal is outputted, similarly to the above, to the motors 7, 7' of the shock absorbers 20, 20' of the front and rear wheel suspensions 5, 5' the attenuation force variable apparatus 30 of the front wheel suspension 5 is switched to a suitable attenuation force at the optimum timing substantially coincident with the arrival of at least the front wheels 2 at the road surface detecting position. Therefore, even at the time of the intermediate speed, in the case where the front wheels 2 and the rear wheels 3 reach the projection A and the recess B of the road surface, the front and rear wheel suspensions 5, 5' actuate the attenuation to control the attitude of the vehicle in a stable manner.

Figure 5C:
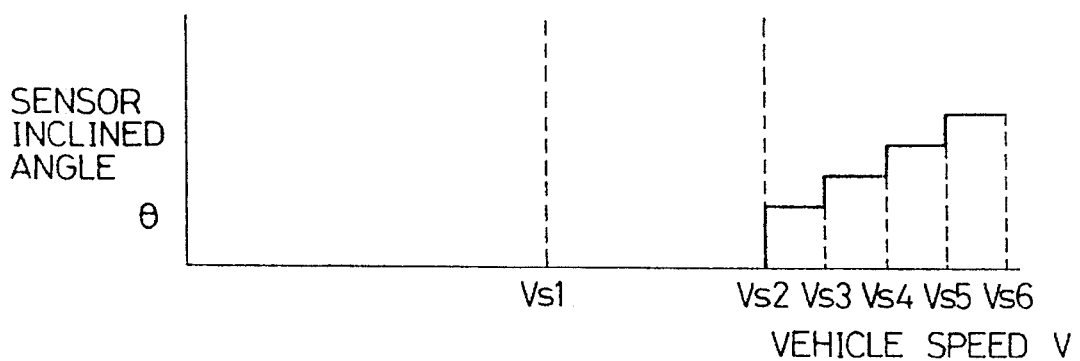

Further, at the time of the high speed equal to or faster than the above-described set vehicle speed Vs2, the flow advances from step S9 to step S13. In this vehicle speed range, sensor inclined angles θ are, for example, respectively set at the vehicle speeds V to θ=30 degrees in the case of Vs2≦V≦Vs3 (120 km/hr), θ=40 degrees in the case of Vs3≦V≦Vs4 (140 km/hr), θ=50 degrees in the case of Vs4≦V≦Vs5 (150 km/hr) and θ=55 degrees in the case of Vs5≦V≦Vs6 (180 km/hr) like the sensor inclined angle characteristics in FIG. 5(c). Then, at the time of the set vehicle speed Vs3 or less, the flow advances to step S14, and the road surface sensor 10 itself is inclined further at 30 degrees forwardly from the state directed directly downwardly in the state held at the sensor maximum displacement amount ΔLmax. Thus, the road surface detecting position is moved with margin further forwardly from the position horizontally moved to the maximum limit in accordance with the angular change of the road surface sensor 10 itself. Even if the vehicle speed V is further accelerated, the delay time Δt of the whole control system is attained.

Then, the flow advances to step S15, and the sensor inclined displacement amount ΔL2 of this case is calculated. At step S16, similarly to the time of the low speed, the delay time ΔT is calculated by subtracting the delay time ΔT of the whole control system from the time (Lo+ΔLmax+ΔL2)/V for the front wheels 2 to reach the position of the whole length of this case in response the vehicle speed V, and the height ΔH of the roughness of the road surface is calculated by the sensor inclined angle θ. Then, at step S17, time hysteresis data ΔT(n) of the delay time ΔT is formed. At step S18, time hysteresis data Δh of the height ΔH of the road surface is formed. At step S19, road surface height information Δh (ΔT) necessary to change the attenuation force this time is calculated depending on the time hysteresis data ΔT(n), the Δh and the calculating period of the microcomputer. At step S20, attenuating force characteristics adapted for the road surface height information Δh (ΔT) are determined, and the attenuation force switching signal is outputted after the delay time ΔT is elapsed.

As described above, at the time of high speed, the road surface sensor 10 is directed forwardly, the road surface information is obtained in the sensor inclined state, and controlled to be outputted at the delay time thereby for the attenuation force variable apparatus 30 of the front wheel suspension 5 to be switched to a suitable attenuation force similarly at the optimum timing substantially coincident with the arrival of at least the front wheels 2 at the road surface detecting position. In the case where the vehicle speed is equal to or faster than the set vehicle speed Vs3, the flow advances from step S13 to S21 and the following steps, and is similarly controlled. Then, even at the time of the high speed, in the case where the front wheels 2 and the rear wheels 3 reach the projection A and the recess B of the road surface, the front and rear wheel suspensions 5, 5' actuate the attenuation to reliably stably control the attitude of the vehicle in a stable manner.

In the case where the road surface sensor 10 detects a flat road surface, the attenuation force variable apparatus 30 is controlled to the characteristics of the third mode which is slightly soft at both the extension and compression sides, thereby improving the riding feel.

The embodiments of this invention have been described, and the horizontal displacement and the angular displacement of the road surface sensor may be controlled arbitrarily in combination. This invention has been also described with respect to the semiactive suspension system, but may also be applied to an active suspension system, a vehicle behavior characteristic changing means.

As described above, according to this invention, the road surface sensor is provided at the vehicle body and so constituted under the control of switching suspension characteristics in response to the rough state of the road surface as to always detect the road surface as near as the vehicle axle by the road surface sensor. Therefore, the road surface can be accurately detected in a state of less influence by pitching of the vehicle, and the control accuracy is also improved. Since the road surface sensor itself is displaced or angularly displaced relative to the delay of the control system to move the road surface detecting position forward, it is always possible to obtain the delay time of the control system. The delay time is calculated in this state as required to so control as to output the attenuation force switching signal, the suspension characteristics can be always switched at the optimum timing relative to the delay of the control system, and the attitude of the vehicle can be reliably stabilized over the whole travel range.

At the time of the intermediate speed, the road surface sensor is displaced, and at the time of the high speed, the road surface sensor is angularly displaced. Accordingly, projection of the road surface sensor is decreased to reliably move the road surface detecting position to a high speed range. Since the road surface sensor is angularly moved by a predetermined displacement amount, the operation is reliably achieved. Since the road surface sensor is projected forwardly of the vehicle body only at the time of the intermediate and high speeds and the projection is relatively small in this case, the sensor does not disturb or damage the vehicle when turning at an acute angle at an extremely low speed. The road surface sensor does not influence the design of the vehicle.

Figure 8:
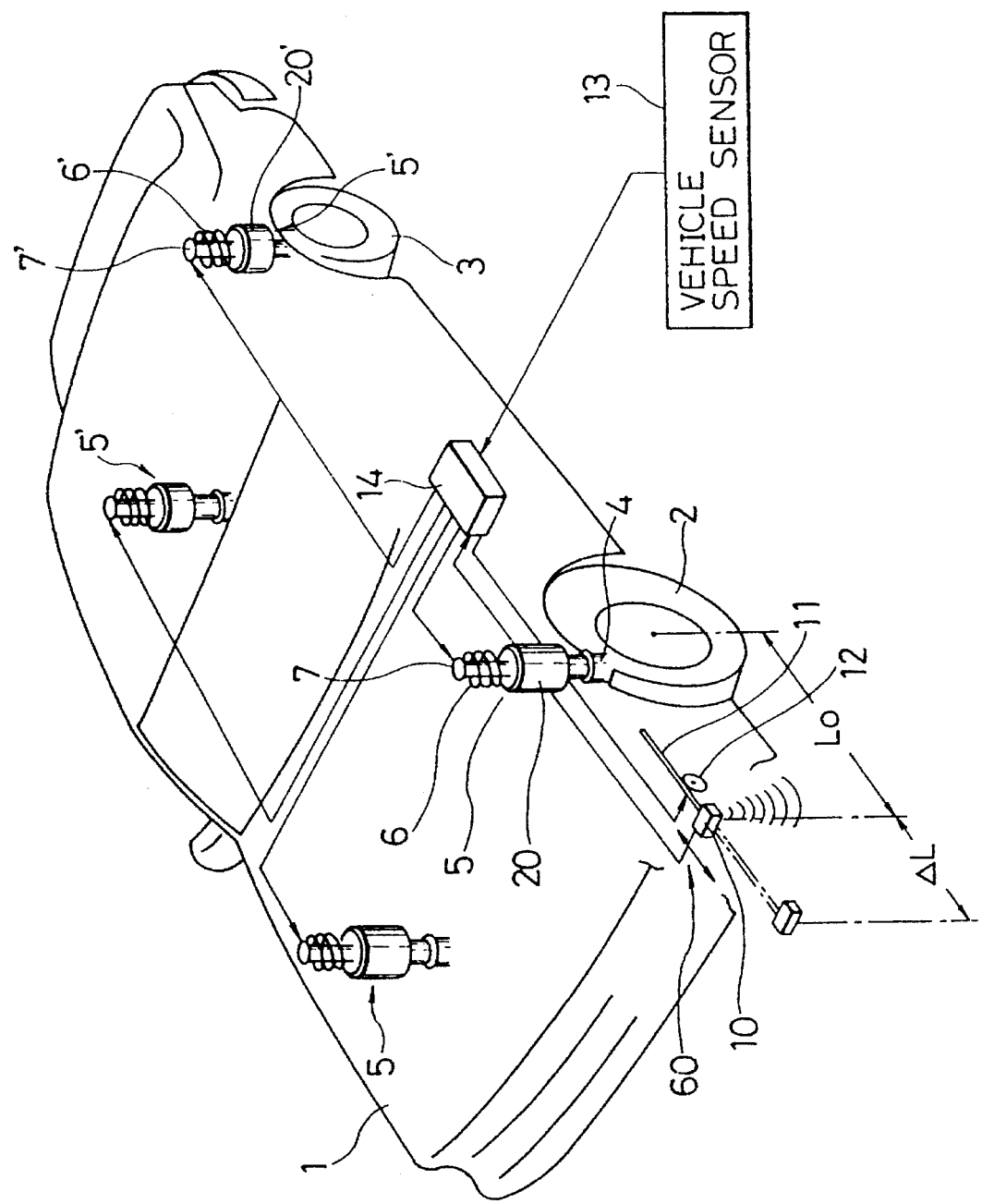
FIG. 8 is a schematic perspective view of another embodiment of an overall suspension control system for a vehicle according to this invention.

FIG. 8 shows a suspension control system for a vehicle according to another embodiment of this invention. Referring first to FIG. 8, a suspension control system for a vehicle will be described. Numeral 1 indicates a vehicle body. Suspensions 5 and 5' between wheel axles 4 of a front wheel 2 and a rear wheel 3, respectively, and the vehicle body 1. The front wheel suspension 5 is provided in parallel with an attenuation force variable shock absorber 20 with a spring 6 between the vehicle body 1 and the wheel axle 4, and an electric motor 7 is provided as an actuator for controlling the switching of attenuation forces at its upper end of the shock absorber 20. The rear wheel suspension 5' is similar to the front wheel suspension 5, wherein the same components are denoted by the same numerals with "prime", and the description of the operation will be omitted.

A road surface sensor 10 for detecting the roughness of a road surface is mounted to a sensor actuation apparatus 60 to change the road surface detecting position. Further, a vehicle speed sensor 13 for detecting the travel state of the vehicle is provided. Signals from the road surface sensor 10 and the vehicle speed sensor 13 are inputted to a control unit 14. The motors 7 and 7' of the front and rear wheel suspensions 5 and 5', the sensor actuation apparatus 60 are actuated in accordance with the output signal of the control unit 14.

The control unit 14 selects an attenuation force switching signal responsive to road surface information, and further controls an output timing of the attenuation force switching signal relative to the delay of a control system and the road surface detecting position. That is, if the vehicle speed is designated by V, the delay time of the whole control system by $\Delta t$, the shortest front-and-rear distance between the sensor and the center of the tire by Lo, a sensor displacement amount of the sensor by $\Delta L$, a delay time to be adjusted when the road surface roughness information is used for controlling by $\Delta T$, and the following equation is satisfied.

$$(Lo+\Delta L)V=\Delta t+\Delta T$$

Then, when the vehicle speed V is low equal to or lower than a set vehicle speed Vs (Lo/$\Delta t$), the delay time $\Delta T$ is determined in a sensor fixed state of $\Delta L=0$ by $\Delta T=Lo/V-\Delta t$, and the attenuation force switching signal is outputted to front and rear wheel suspensions 5, 5'. When the vehicle speed V is intermediate and high equal to or faster than the set vehicle speed Vs and impossible to calculate the delay time, $\Delta T=0$ is satisfied. Then, the sensor travel amount $\Delta L$ is determined by $\Delta L=V \cdot \Delta t=Lo$, and a travel signal is outputted to the sensor actuation apparatus 60.

Figure 9:
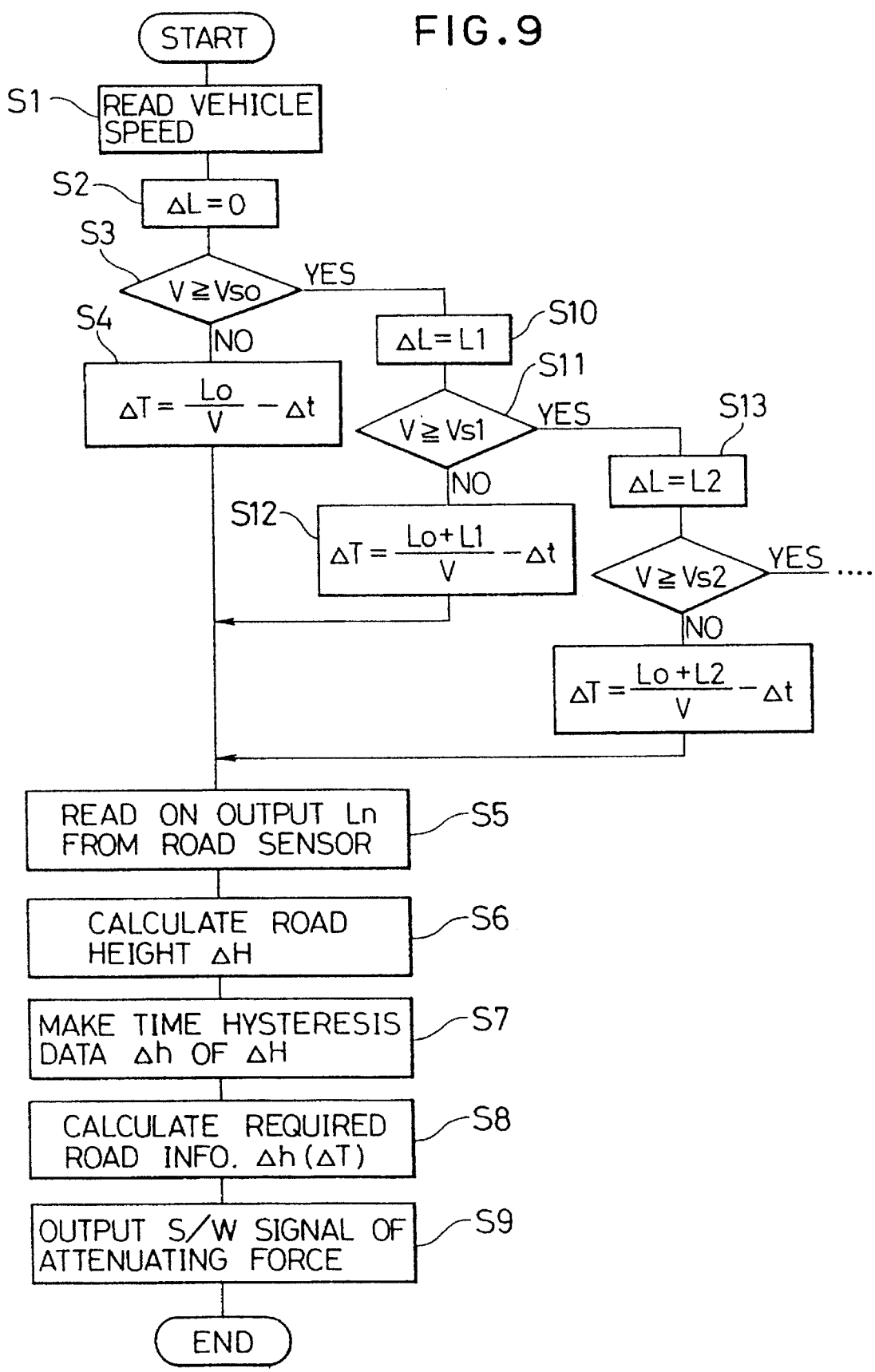
FIG. 9 is a flow chart showing control of switching suspension characteristics in response to the rough state of a road surface.
Figure 10A:
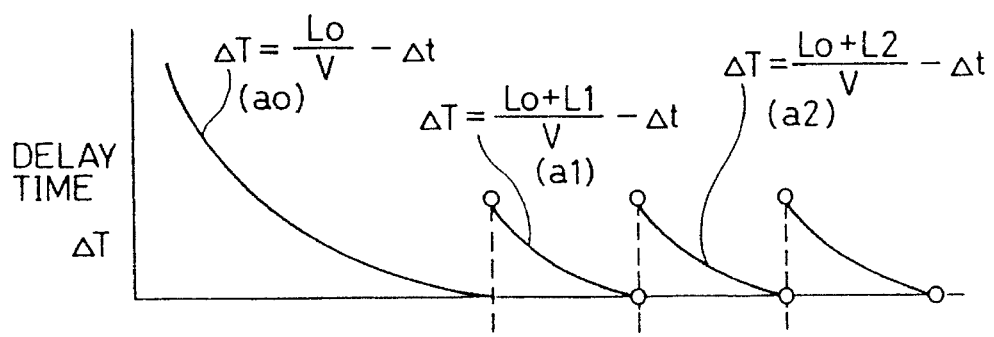
FIGS. 10a and 10b are graphs indicating attenuation force characteristics of a suspension.
Figure 10B:
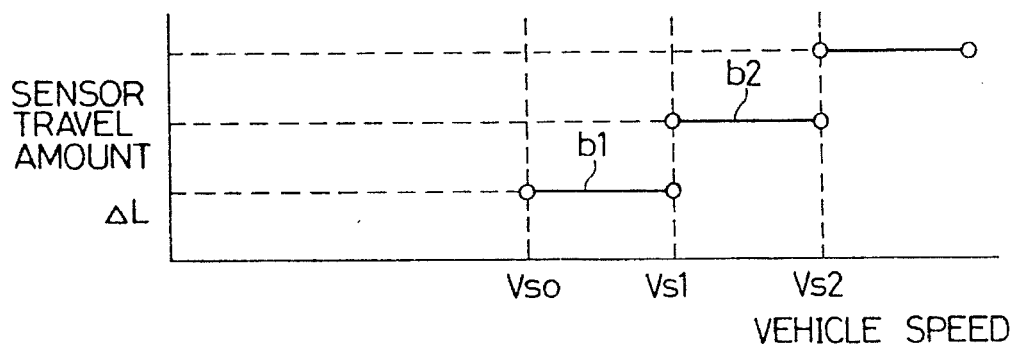
Figure 11:
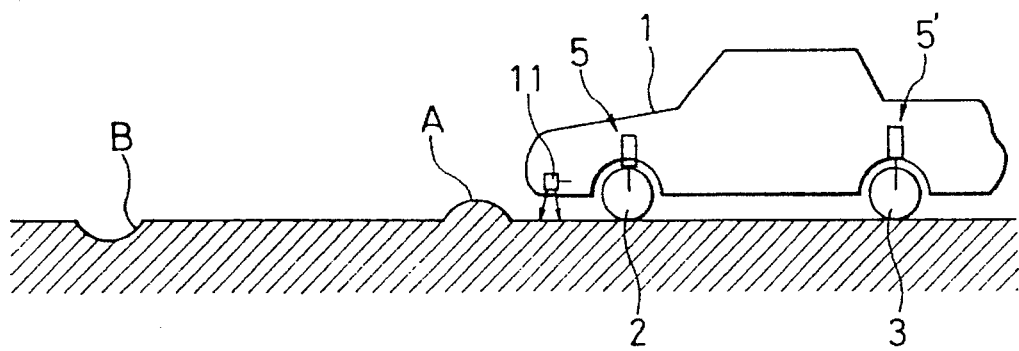
FIG. 11 is a schematic view showing a rough state of a road surface.

Referring to FIGS. 9 to 11, an operation of yet another embodiment of this invention is shown. When the vehicle travels, the vehicle speed V is read at step S1. A sensor position of $\Delta L=0$ is fixed to a shortest distance at step S2. At step S3, the vehicle speed V is compared with the set vehicle speed VsO (Lo/$\Delta t$) at step S3 to check a travel state. In this case, as practical values, Lo=0.5 m and $\Delta t=0.03$ sec. are, for example, employed. Then, Vs0=60 km/hr is obtained.

Then, at the time of a low speed equal to or lower than the set vehicle speed VsO, the flow advances to step S4, the road surface sensor 10 is fixed to the shortest distance in the state directed directly downward by $\Delta L1=\theta=0$, and the delay time $\Delta T$ is calculated at step S4. Then, the delay time $\Delta T$ is calculated by subtracting the delay time $\Delta t$ of the whole control system from the time Lo/V when the front wheel 2 reaches the road surface detecting position (Lo) in response to the vehicle speed V to be adjusted in a decreasing function manner with respect to the vehicle speed V as shown by delay time characteristics in FIG. 10(a). Thus, in the case where the vehicle speed V is low and the front wheel 2 extends relatively slowly to the road surface detecting position of the road surface sensor 10, the delay time $\Delta T$ is also increased correspondingly.

Then, at step S5, the height $\Delta H$ of the roughness of the road surface is calculated. At step S6, time hysteresis data $\Delta h$ of the height $\Delta H$ of the road surface is determined. At step S7, road surface height information $\Delta h$ ($\Delta T$) necessary to change the attenuation force this time is calculated depending on the time hysteresis data $\Delta h$ and the calculating period of a microcomputer. At step S8, attenuating force characteristics adapted for the road surface height information $\Delta h$ are determined, and the attenuating force switching signal is simultaneously outputted to the motors 7, 7 of the shock absorbers 20, 20' of the front and rear wheel suspensions 5, 5' after the delay time $\Delta T$ is elapsed. Then, in the case where the above-described vehicle speed V is low, the attenuation force switching signal is slowly outputted at a longer delay time $\Delta T$, thereby switching the attenuation force variable apparatus 30 of the front wheel suspension 5 to a suitable attenuation force at the optimum timing substantially coincident with the case where at least the front wheels 2 reach the road surface detecting position.

As shown in FIG. 11, when the road surface sensor 10 detects a projection A, the attenuation force switching signal of the second mode of FIG. 3 is outputted to the motors 7, 7' and the attenuation force variable apparatus 30 of the front wheel suspension 5 is switched to the characteristics. Thus, in the case where the front wheels 2 actually travel into the protrusion A to move above protrusion A, the attenuation force variable apparatus 30 actuates the attenuation which is soft at the compression side and hard at the extension side. Then, in the case where the rear wheels 3 travel into the protrusion A, since the rear wheel suspensions 5' are already switched to the same characteristics, the attenuation force variable apparatus 30 similarly actuates the attenuation to suppress the upward movement of the vehicle body 1.

On the other hand, when the road surface sensor 10 detects a recess B, the attenuation force switching signal of the first mode of FIG. 3 is outputted to the motors 7, 7' this time. In the case where the front wheels 2 and the rear wheels 3 actually travel into the recess B to move downwardly, the attenuation force variable apparatus 30 of the front and rear wheel suspensions 5, 5' actuates the attenuation which is soft at the extension side and hard at the compression side to suppress the downward movement of the vehicle body 1. Thus, the vehicle body 1 of the vehicle is reliably controlled to hold an attitude which moves up and down less than the protrusion A and the recess B in the road surface.

Then, at the time of intermediate and high speeds equal to or faster than the set vehicle speed VsO, the flow advances from step S3 to step S10 of the flow chart of FIG. 9. In terms of $\Delta L=L1$, a road surface detecting position is set like a curve b1 of sensor travel characteristic of FIG. 10(b), and the travel signal is outputted. Then, the road surface sensor 10 itself projects forwardly of the vehicle body by the displacement apparatus 11, and the road surface detecting position is traveled forwardly at a distance corresponding to the sensor travel amount L1. Thus, as the vehicle speed V is accelerated, the front wheel 2 rapidly reaches the road surface detecting position, the road surface detecting position is moved forwardly of the vehicle body by a margin. Thus, the delay time $\Delta t$ of the whole control system is obtained again similarly to the above-described operation, and the delay time $\Delta T$ can be calculated.

At the time of an intermediate speed equal to or lower than the set vehicle speed Vs2, the flow advances to step S10. At step S10, $\Delta T=0$ is set fixedly. In this case, the sensor horizontal displacement amount $\Delta L1$ is calculated by subtracting the sensor front-and-rear shortest distance Lo from the distance V $\Delta T$ advancing in response to the vehicle speed V and the delay time $\Delta T$ of the whole control system as shown in FIG. 6(b). At step S11, the height $\Delta H$ of the roughness of the road surface is calculated similarly to the above. At step S12, the displacement signal is outputted to the displacement apparatus 11. The road surface sensor 10 itself is moved in the state directed directly downwardly, and the road surface detecting position is moved forwardly of the front wheel 2 by the sensor horizontal displacement amount $\Delta L1$.

When the vehicle speed V is accelerated to the set vehicle speed Vs1 or more, the flow advances to steps S11 to S13 of a flow chart of FIG. 9, and the sensor travel amount $\Delta L$ is increased to L2, and similarly controlled. In this case, practical values are set to Lo=0.5 m, ∆t=0.03 sec. and the maximum sensor travel amount is set, for example, to ∆L=0.5 m, and then the controllable maximum vehicle speed becomes 120 km/hr to be sufficiently practical.

In the case where the road surface sensor 10 detects a flat road surface, the attenuation force variable apparatus 30 is controlled to the characteristics of the third mode which is slightly soft at both the extension and compression sides, thereby improving the riding feel.

As the embodiment of this invention, the semiactive suspension system has been described, and this invention may also be applied to an active suspension system, vehicle behavior characteristics changing means.

As described above, according to this invention, the road surface sensor is provided at the vehicle body and so constituted under the control of switching suspension characteristics in response to the rough state of the road surface as to always detect the road surface near the vehicle axle. Therefore, the road surface can be accurately detected in the state of less influence by pitching of the vehicle, and the control accuracy is also improved. Since the road surface sensor itself is longitudinally displaced or angularly displaced relative to the delay of the control system to move the road surface detecting position forwardly, it always enables obtaining the delay time of the control system. The delay time is calculated in this state as required to so control as to output the attenuation force switching signal, the suspension characteristics can be always switched at the optimum timing relative to the delay of the control system, and the attitude of the vehicle can be reliably stabilized in the whole travel area. Further, the projection of the road surface sensor may be decreased, and the delay time can be easily controlled.

Since the road surface sensor is arranged to travel in a forward and rearward direction by the displacement apparatus, the structure is simple with high practicability. The road surface sensor is projected forwardly of the vehicle body gradually as the vehicle is accelerated, and hence the sensor does not disturb or damage the vehicle when turning at an acute angle at an extremely low speed. The road surface sensor does not affect the design of the vehicle.

Figure 12:
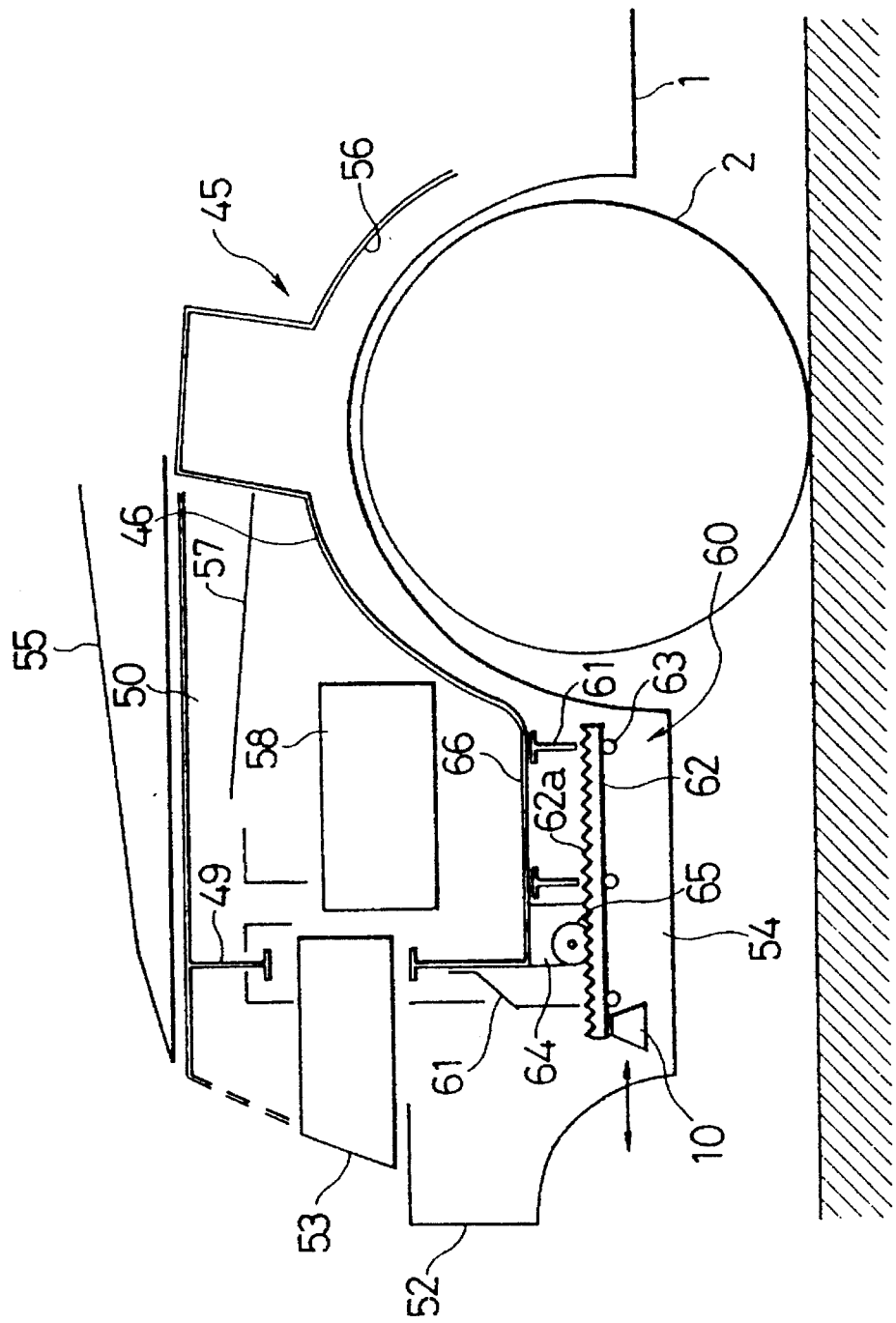
FIG. 12 is an enlarged sectional side view showing the mounted state and arrangement of a sensor actuation apparatus.
Figure 13:
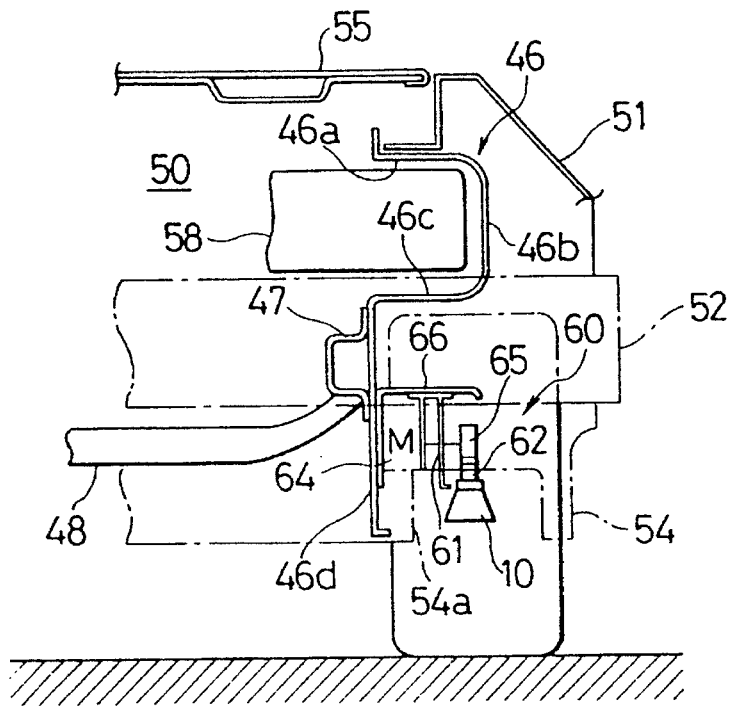
FIG. 13 is an enlarged sectional frontal view of the sensor mounting shown in FIG. 12.

Referring to FIGS. 12 and 13, the mounting structure of the road surface sensor 10 will be described. Right and left fender aprons 46 of a front body 45 of the monocoque body 1 are suitably bent. The lower portions of the fender aprons 46 are coupled to a side member 47 and the front portions of the fender aprons 46 are coupled to a cross member 48 and a radiator support 49 to constitute an engine compartment 50. A front fender 51, a bumper 52, head lamps 53, a skirt 54 and a hood 55 are mounted on the fender aprons 46 and the radiator support 49. A front wheel 2 is contained in a wheel housing 56. An engine 57 and various components are placed in the engine compartment 50. A portion of the fender apron 46 immediately in front of the front wheel is bent from an upper hood retainer 46a to a lower vertical portion 46d through a vertical portion 46b and a horizontal portion 46c. Components 58 such as a battery and air cleaner, are mounted in the horizontal portion 46c of the fender apron 46. Since the horizontal portion 46c and the vertical portion 46d are relatively long in a front-and-rear direction, the sensor actuation apparatus 60 is mounted by utilizing the outside space.

The sensor actuation apparatus 60 has a mounting plate 66 of an L-shaped section and is horizontally fixed to the outside of the vertical portion 46d of the fender apron 46 and a bracket 61 suspended forward of the mounting plate 66 and the radiator support 49. The road surface sensor 10 is fixed to the end of a long linear rail 62 directly downward in order to detect the rugged state of the road surface. The rail 62 is mounted on the bracket 61 through rollers 63. A pinion 65 of a motor 64 is engaged with a rack 62a of the rail 62. A cutout 54a is formed partly at a position of the skirt 54 coincident with the road surface sensor 10. Thus, the road surface sensor 10 is sequentially projected forward of the skirt 54 from a shortest forward and rearward distance contained in the skirt 54 by the driving motor to travel horizontally.

The operation of this embodiment will now be described. First, when the vehicle travels at a low speed slower than a set vehicle speed Vs, the road surface sensor 10 is fixed to a position of the shortest front-and-rear distance Lo retracted into the skirt 54 in the case of ∆=0 according to a signal from the control unit 14 by the motor 64 of the sensor actuation apparatus 60. In this manner, the road surface sensor 10 can always accurately detect a road surface immediately before the front wheels 2. The control unit 14 inputs road surface information from the road surface sensor 10, determines attenuating force characteristics adapted for the ruggedness of the road surface, and simultaneously outputs attenuating force switching signals to the motors 7, 7' of shock absorbers 20, 20 of the front and rear wheel suspensions 5, 5'.

Figure 14A:
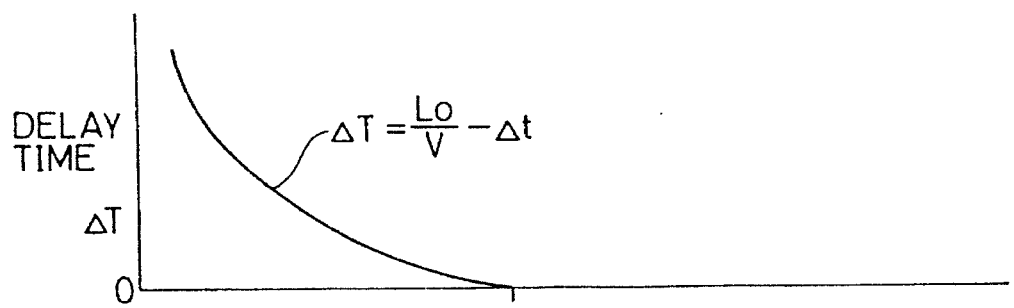
FIGS. 14a and 14b are graphs showing an adjusted state of a delay time and the sensor travel amount.

At this time, an output timing of the attenuating force switching signal is regulated, as shown in FIG. 14a, to a delay time ∆T obtained by subtracting a delay time ∆t of the entire control system from a time Lo/V at which the front wheels 2 reach a road surface detecting position (Lo) in response to a vehicle speed V. Therefore, in the case where the vehicle speed V is low and the front wheels 2 reach the road surface detecting position of the road surface sensor 10 relatively late, the attenuating force switching signals are late in being output according to the long delay time ∆T in response thereto. Consequently, the attenuating force variable apparatus 30 of the front wheel suspension 5 is switched to a suitable attenuating force at the optimum timing substantially coincident with the arrival of the front wheels 2 at the road surface detecting position.

As shown in FIG. 11, when the road surface sensor 10 at the front side of the vehicle body 1 detects a projection A, the attenuating force variable signal of the second mode of FIG. 3 is outputted. That is, when the front wheels 2 first reaches the projection A, the attenuating force variable signal is outputted to the motor 7 of the front wheel suspension 5, and the attenuating force variable apparatus 30 can actuate the characteristics of the second mode. Then, in the case where the front wheels 2 actually travel over the protrusion A to travel above the protrusion A, the attenuating force variable apparatus 30 actuates the attenuating which is soft at the compression side and hard at the extension side. Then, in the case where the rear wheels 3 travel over the protrusion A, the rear wheel suspensions 5' can be already actuated by the same characteristics. Thus, even if the front wheels 2 travel to the next rough surface, the attenuation is actuated similarly by the rear wheel suspension 5' irrespective of the travel of the front wheels, thereby reliably suppressing the upward travel of the vehicle body.

On the other hand, when the road surface sensor 10 detects a recess B, the attenuating force variable signal of the first mode of FIG. 3 is outputted to the motors 7 at the timing of the delay time ∆Tf, then outputted to the motor 7' at the timing of the delay time ∆Tr as delayed. Thus, in the case where the front wheels 2 and the rear wheels 3 sequentially travel into the recess B to displace downwardly, the attenuating force variable apparatus 30 of the front and rear wheel suspensions 5, 5' actuate the attenuation which is soft at the extension side and hard at the compression side in the characteristics of the first mode to reliably suppress the downward displacement of the vehicle body 1. Thus, the vehicle body 1 of the vehicle is so controlled as to hold an attitude of less up-and-down displacements relative to the projection A and the recess B in the road surface.

Figure 14B:
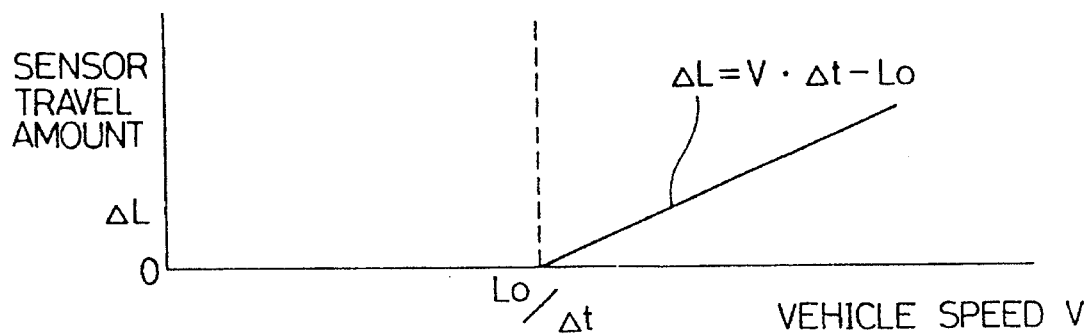

Then, if the vehicle travels at intermediate or high speed in which a delay time cannot be calculated at the set vehicle speed Vs or higher, the control unit 14 fixes the delay time $\Delta T$ to $\Delta T=0$. In this case, the control unit 14 subtracts the sensor shortest front-and-rear distance Lo from a distance $V \cdot \Delta t$ at which the vehicle travels forward in response to the delay time $\Delta t$ of the entire control system at the vehicle speed V to calculate a sensor travel amount $\Delta L$ as shown in FIG. 14b, and outputs the travel signal to the motor 64 of the sensor actuation apparatus 60. Then, the rail 62 is moved by the pinion 65 of the motor 64 and the rack 62a. The road surface sensor 10 itself is sequentially horizontally projected forward of the skirt 54 to move the road surface detecting position forward of the front wheels 2 by the sensor travel amount $\Delta L$.

In the case where the front wheels 2 rapidly reach the road surface detecting position when the vehicle speed V of the vehicle is accelerated, the road surface detecting position is so controlled correspondingly by the movement of the road surface sensor 10 itself as to be forwardly positioned from the vehicle body, thereby always obtaining the delay time $\Delta t$ of the entire control system. Therefore, even if the attenuating force switching signal responsive to the road surface information is output to the motors 7, 7' of the shock absorbers 20, 20' of the front and rear wheel suspensions 5, 5' after the delay of the control system, the attenuating force variable apparatus 30 of the front wheel suspension 5 is switched to the suitable attenuating force at the optimum timing substantially coincident with the arrival of at least the front wheels 2 at the road surface detecting position. Then, when the front and rear wheels 2, 3 reach the projection A and the recess B in the road surface at the intermediate or high speed, the front and rear wheel suspensions 5, 5' are attenuated to reliably stabilize and control the attitude of the vehicle.

Figure 15:
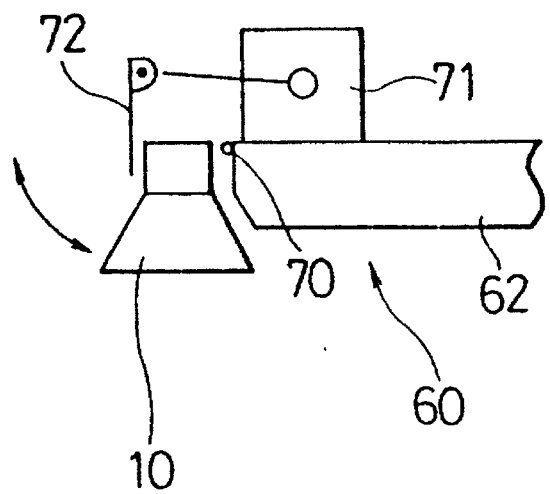
FIG. 15 is a side view of a main portion of a second embodiment of a sensor actuation apparatus.

Referring to FIG. 15, still another embodiment of the present invention will be described in the case where an angle is varied when a sensor is moved. In this embodiment, in a sensor actuation apparatus 60, a road surface sensor 10 is mounted at an end of a rail 62 so as to enable the angle to change, and pin 70 acts as a fulcrum. The other motor 71 is mounted at the end of the rail 62, and the motor 71 is coupled to the road surface sensor 10 through a link 72. In this case, a travel signal is output to the motor 64 of the sensor actuation apparatus 60 at an intermediate or high speed, the road surface sensor 10 is moved forward by a predetermined amount. An angle signal is output to the other motor 71 under the condition of further higher speed. Therefore, the road surface sensor 10 is so changed in its angle by the motor 71 and the link 72 as to be gradually inclined from a state directed directly downward toward a state directed forward. In this manner, the road surface detecting position is further moved forward in a state that the projection of the road surface sensor 10 is suppressed at the high speed, and suspension characteristics of the front and rear wheel suspensions can be switched at the optimum timing.

Figure 16:
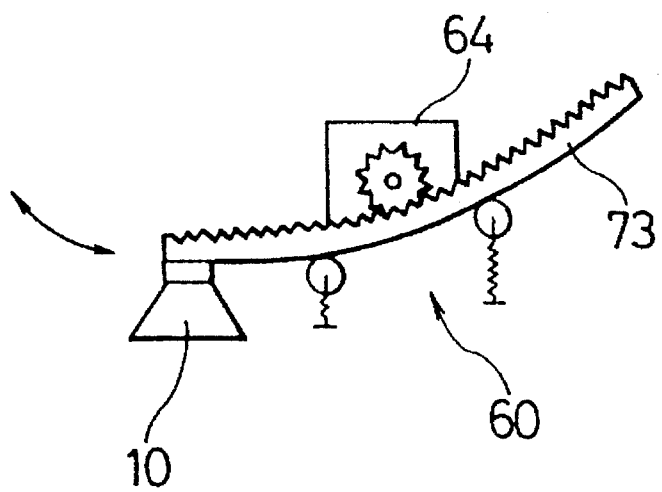
FIG. 16 is a side view showing a main portion of a third embodiment of a sensor actuation apparatus.

Referring to FIG. 16, still another embodiment of the present invention will be described in the case where travel and angle change of a sensor are simultaneously controlled.

In this embodiment, in a sensor actuation apparatus 60, a rail 73 having a road surface sensor 10 is bent, and the road surface sensor 10 is guided movably in a circular-arc of travel. In this case, when a control signal is output to a motor 64 of the sensor actuation apparatus 60 to be driven at an intermediate or high speed, the rail 73 is moved in a circular-arc, and the road surface sensor 10 is so controlled as to gradually travel forward and simultaneously incline forward, thereby moving forward effectively at the road surface detecting position by a small amount.

As described above, the present invention has been described with respect to a semiactive suspension system. However, the present invention is not limited to the particular embodiments. For example, the present invention may also be applied to an active suspension system, vehicle behavior characteristic changing means.

As described above, according to this invention, the road surface sensor is provided at the vehicle body and so constituted under the control of switching suspension characteristics in response to the rough state of the road surface as to mount the road surface sensor under the fender apron forward of the front wheels of the front body by the sensor actuation apparatus. Therefore, the road surface forward of the front wheels can be always accurately detected, and the assembling properties of the sensor actuation apparatus is improved. Particularly, since the road surface sensor is so controlled by the sensor actuation apparatus as to travel in a horizontal front-and-rear direction or varied in its angle and to travel the road surface detecting position forward of the vehicle body based on the distance traveled by the vehicle speed and the delay time of the entire control system at the intermediate or high speed, the suspension characteristics can be always switched with respect to the delay of the control system at the optimum timing, thereby reliably stabilizing the attitude of the vehicle in the entire traveling area.

The suspension control system for traveling the road surface sensor in a horizontal front-and-rear direction of the embodiment provides high accuracy of detecting the road surface. The suspension control system for varying the angle of the road surface sensor of the embodiment reduces the travel of the road surface sensor and can further apply up to a high speed range. The suspension control system for simultaneously controlling the travel and the angle change of the road surface sensor of the embodiment can efficiently change the road surface detecting position.

Figure 17:
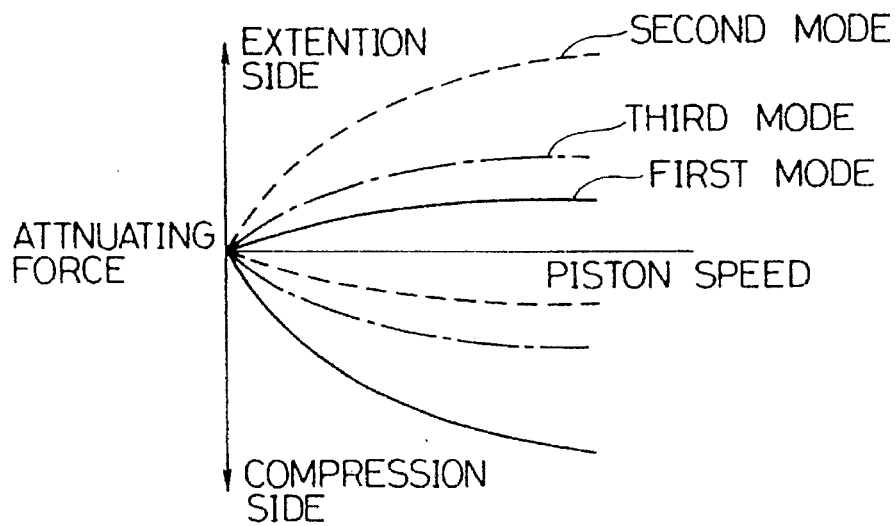
FIG. 17 is a graph showing attenuation force characteristics responsive to a rough state of a road surface.
Figure 18:
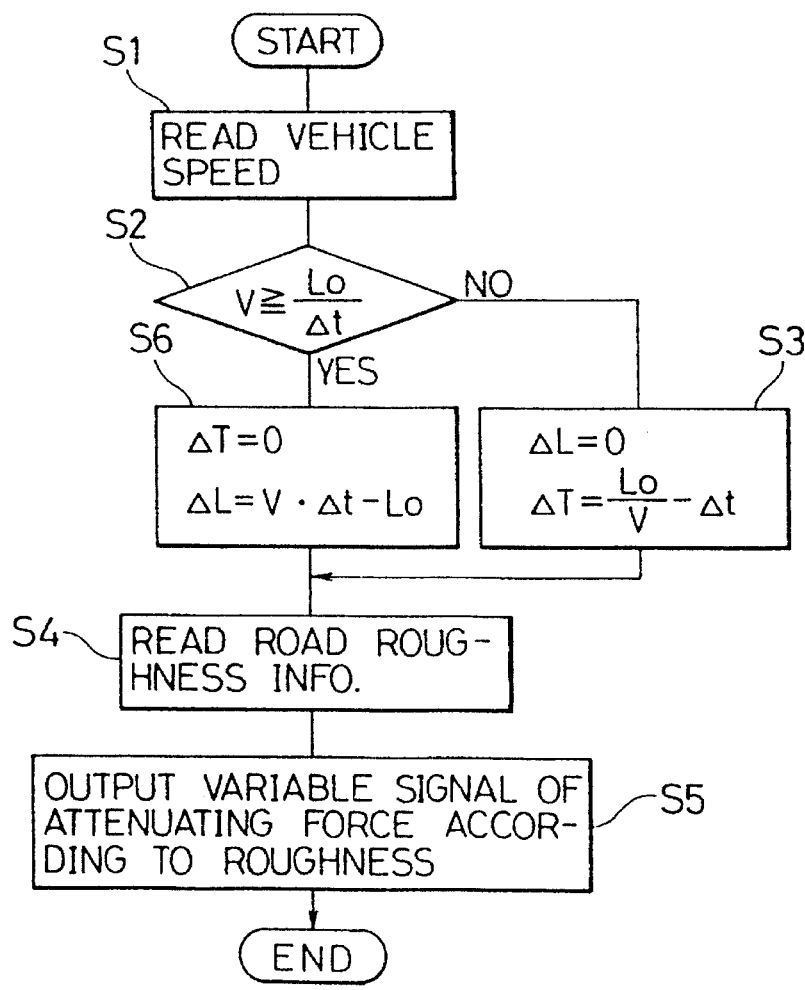
FIG. 18 is a flow chart indicating the control of changing suspension characteristics in response to a rough state of a road surface.
Figure 19A:
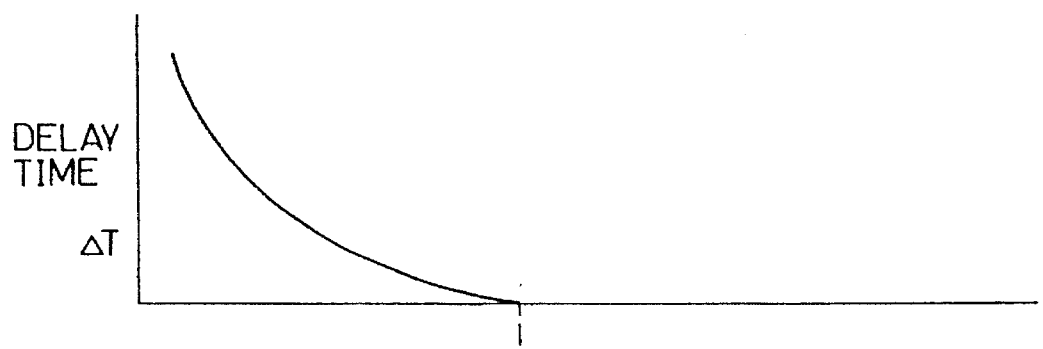
FIGS. 19a and 19b are graphs showing an adjusted state of a delay time and a sensor travel amount.

FIGS. 17 to 19 show still another embodiment of this invention. When the vehicle travels, the vehicle speed V is read at step S1. At step S2, the vehicle speed V is compared with Lo/$\Delta t$ to check the travel state. In this case, as practical values, Lo=0.5 m and $\Delta t$=0.03 sec. are, for example, employed. Then, Lo/$\Delta t$=60 km/hr is obtained. Then, at the time of a low speed equal to or lower than 60 km/hr, the flow advances to step S3. At step S3, in terms of $\Delta L$=0, the sensor position is fixed to a shortest distance, and the delay time $\Delta T$ against the front wheel suspension 5 is adjusted in response to the vehicle speed V in accordance with the above-described equation. The delay time $\Delta T$ of this case is indicated by a solid line in FIG. 19(a) to the vehicle speed V, and adjusted in a decreasing function manner to a predetermined vehicle speed Lo/$\Delta t$. At step S4 road surface roughness information by the road surface sensor 10 is read. At step S6, an attenuation force variable signal adapted for the roughness information is simultaneously outputted to motors 7, 7' of shock absorbers 20, 20' of front and rear wheel suspensions 5, 5' at the timing when the delay time $\Delta T$ is elapsed.

The delay time ΔT against the rear wheel suspension 5' is adjusted in response to the vehicle speed V in accordance with the above-described equation. The delay time ΔT of this case is adjusted in a smoothly decreasing function manner as shown by a broken line in FIG. 19(a) to the vehicle speed V. Therefore, the delay time ΔT is always delayed to be largely set to the delay time ΔTf. Then, the flow advances to step S4. At step S4, road surface roughness information of the road surface sensor 10 is read. At step S5, the attenuation force variable signal adapted for the roughness information is outputted to the motor 7 of the shock absorber 20 of the front wheel suspension 5 at the timing when the delay time ΔTf is elapsed. The similar attenuation force variable signal is delayed by the delay time ΔTr, and outputted to the motor 7 of the shock absorber 20' of the rear wheel suspension 5'.

As shown in FIG. 6, when the road surface sensor 10 at the front side of the vehicle body 1 detects a projection A, the attenuation force variable signal of the second mode of FIG. 3 is outputted. That is, when the front wheels 2 first reaches the projection A, the attenuation force variable signal is outputted to the motor 7 of the front wheel suspension 5, and the attenuation force variable apparatus 30 can actuate the characteristics of the second mode. Then, in the case where the front wheels 2 actually travel on the protrusion A to move above the protrusion A, the attenuation force variable apparatus 30 actuates the attenuation which is soft at the compression side and hard at the extension side. Then, in the case where the rear wheels 3 travel the protrusion A, since the rear wheel suspensions 5' can be already actuated in the same characteristics. Thus, even if the front wheels 2 are transferred to next rough surface, the attenuation is actuated similarly by the rear wheel suspension 5' irrespective of the transfer, thereby reliably suppressing the upward movement of the vehicle body 1.

On the other hand, when the road surface sensor 10 detects a recess B, the attenuation force variable signal of the first mode of FIG. 3 is outputted to the motors 7 at the timing of the delay time ΔT, then outputted to the motor 7' at the timing of the delay time ΔT delayed. Thus, in the case where the front wheels 2 and the rear wheels 3 sequentially travel the recess B to displace downwardly, the attenuation force variable apparatus 30 of the front and rear wheel suspensions 5, 5' actuate the attenuation which is soft at the extension side and hard at the compression side in the characteristics of the first mode to reliably suppress the downward displacement of the vehicle body 1. Thus, the vehicle body 1 of the vehicle is so controlled as to hold an attitude of less up-and-down displacements against the projection A and the recess B of the road surface.

Figure 19B:
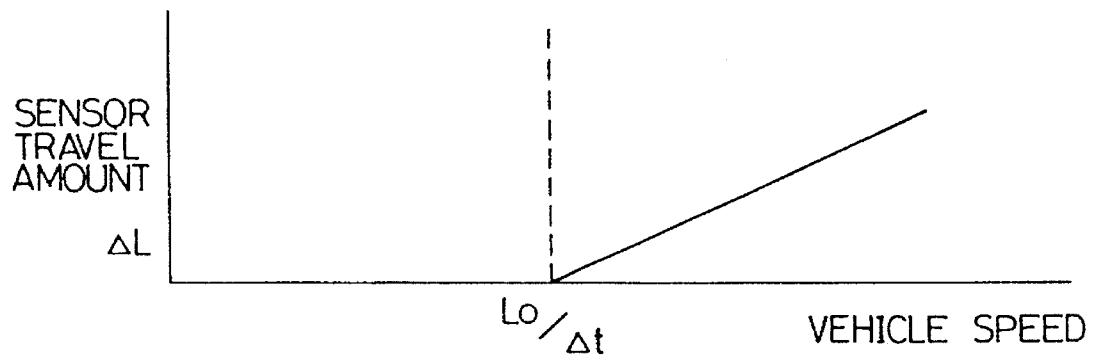

Then, if the vehicle speed V is accelerated equal to or faster than the above-described 60 km/hr, the flow advances from the step S2 to step S6 of the flow chart of FIG. 18. The delay time ΔT is fixed to the front wheel suspension 5 in terms of ΔT=0. The sensor displaced amount ΔL is adjusted in response to the vehicle speed V in accordance with the above-described equation. The sensor displaced amount ΔL of this case becomes as shown in FIG. 19b to the vehicle speed V, and adjusted in an increasing function manner after a predetermined vehicle speed Lo/Δt.

In this case, the road surface sensor 10 is sequentially moved forwardly at a distance corresponding to the delay time Δt of the whole control system from the position of a shortest front-and-rear distance near the front wheel 2 by the displacement apparatus 11 and the road surface is early detected. Thus, the road surface roughness information is early obtained by the road surface sensor 10, thereby absorbing the delay of the whole control system. In this case, practical values are set to Lo=0.5 m, Δt=0.03 sec. and the maximum sensor displaced amount ΔL is, for example set to Δ=0.5 m. Then, controllable maximum vehicle speed becomes 120 km/hr to be sufficiently practical. On the other hand, the delay time ΔT is similarly adjusted in this case to the rear wheel suspension 5' and determined.

The flow then advances to steps S4 and S5 of the flow chart of FIG. 18. Then, the attenuation force variable signal adapted for the roughness information of the road surface is immediately outputted to the front wheel suspension 5. The attenuation force variable signal is delayed by the delay time ΔT and outputted to the rear wheel suspension 5'. Then, in the case where the front wheels 2 and the rear wheels 3 sequentially reach and travel the projection A and the recess B of the road surface, the front and rear wheel suspensions 5, 5' similarly actuate the attenuation to change the suspension characteristics, thereby controlling the attitude of the vehicle in a stable manner.

In the case where the road surface sensor 10 detects a flat road surface, the attenuation force variable apparatus 30 is controlled to the characteristics of the third mode which is slightly soft at both the extension and compression sides, thereby improving the riding feel.

As described above, according to this invention, the road surface sensor is provided at the vehicle body and so constituted under the control of the attitude of the vehicle for changing suspension characteristics in response to the rough state of the road surface as to always detect the road surface as near as the vehicle axle by the road surface sensor. Therefore, the road surface can be accurately detected in the state of less influence of pitching of the vehicle, and the control accuracy is also improved. The delay time is adjusted or the sensor displaced amount is adjusted to the sensor mounted position and the delay time of the whole control system in the front wheel suspension to control to input the attenuation force variable signal, and hence the characteristics of the suspension can be suitably changed in a wide vehicle speed range. At the time of intermediate and high speeds, the road surface sensor is controlled to sequentially travel forwardly so as to absorb the delay time, and hence the suspension characteristics in the respective traveling states can be suitably changed. Thus, the performance of changing the suspension characteristic of the wide vehicle speed range can be sufficiently obtained, and easily controlled.

Since the road surface sensor is constituted to move in front-and-rear direction by the displacement apparatus, its structure is simple and practicability is high. Since the road surface sensor projects forwardly of the vehicle body only at the time of intermediate and high speeds, it is not disturbed or damaged at the time of turning at an extremely low speed. The road surface sensor does not affect influence to the design of the vehicle.

Figure 20:
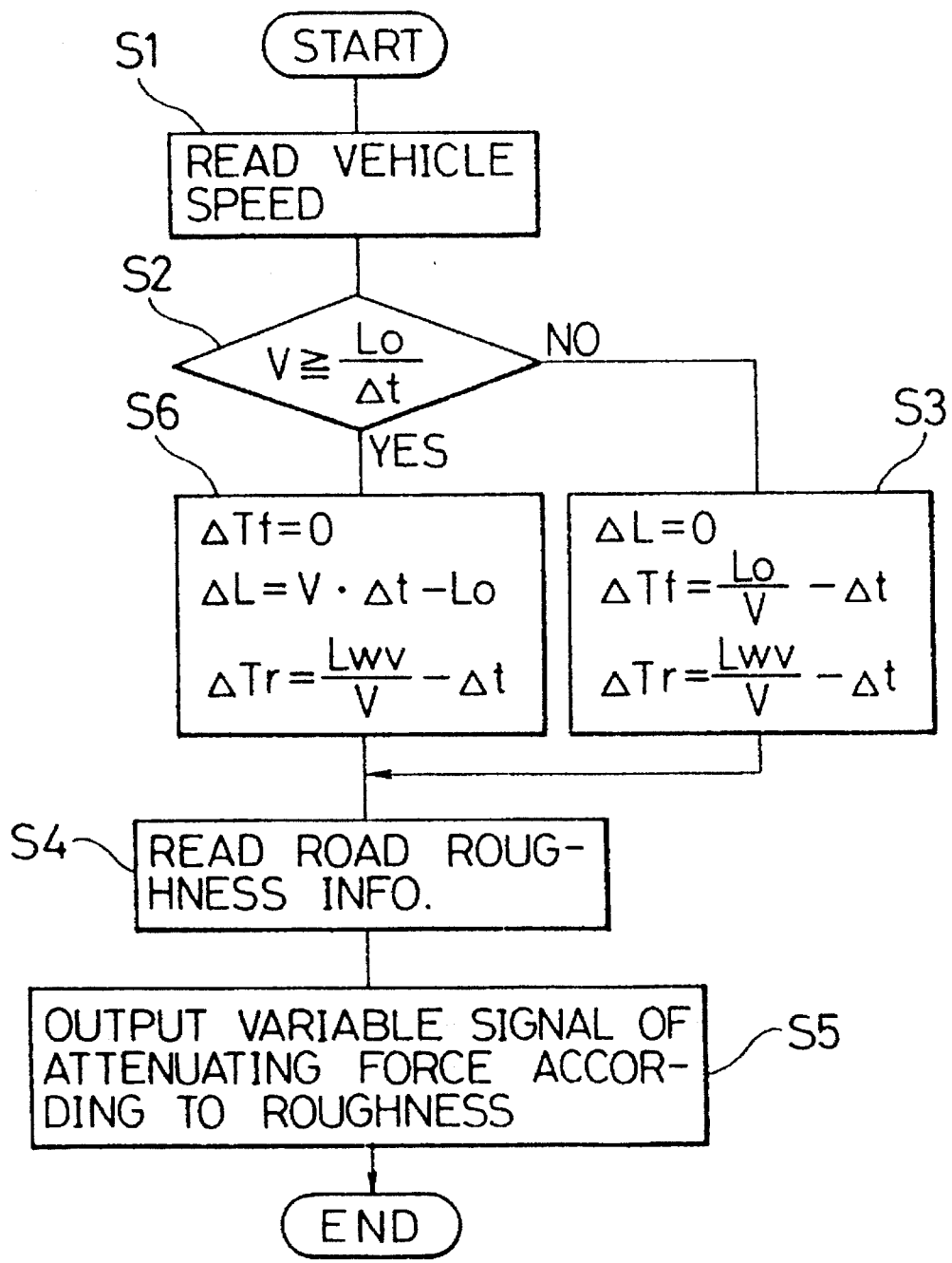
FIG. 20 is a flow chart indicating the control of changing suspension characteristics in response to a rough state of a road surface.
Figure 21A:
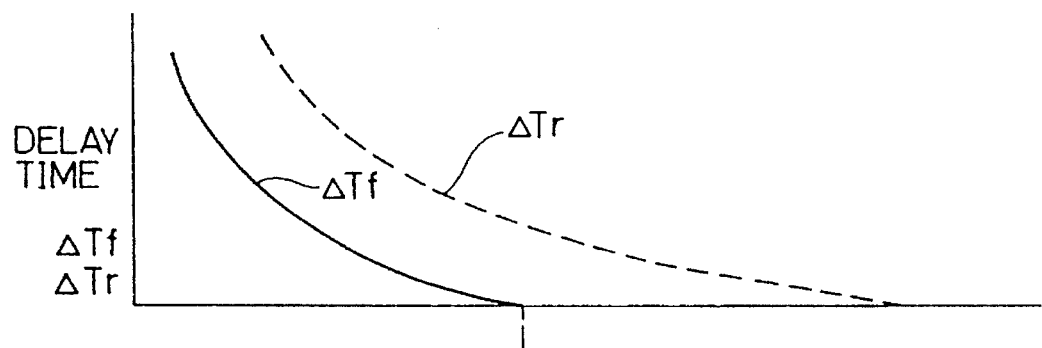
FIGS. 21a and 21b are graphs showing an adjusted state of a delay time and a sensor travel amount.

Referring to FIGS. 20 and 21, still another embodiment of the invention will be described.

Figure 21B:
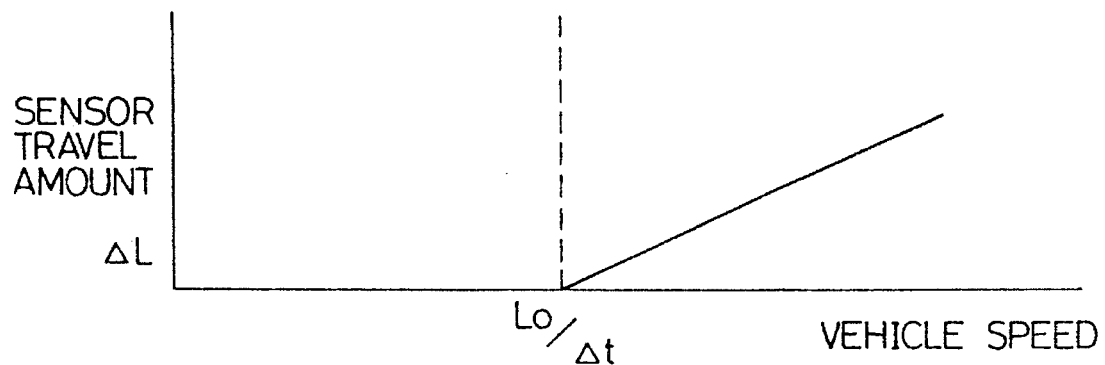

When the vehicle speed V is accelerated equal to or faster than the above-described 60 km/hr, the flow advances from the step S2 to step S6 of the flow chart of FIG. 20. The delay time ΔTf is fixed to the front wheel suspension 5 in terms of ΔTf=0. The sensor displaced amount ΔL is adjusted in response to the vehicle speed V in accordance with the above-described equation. The sensor displaced amount ΔL of this case becomes as shown in FIG. 21(b) to the vehicle speed V, and adjusted in an increasing function manner after a predetermined vehicle speed Lo/Δt.

In this case, the road surface sensor 10 is sequentially moved forwardly at a distance corresponding to the delay time Δt of the whole control system from the position of a shortest front-and-rear distance near the front wheel 2 by the displacement apparatus 11 and the road surface is early detected. Thus, the road surface roughness information is early obtained by the road surface sensor 10, thereby absorbing the delay of the whole control system. In this case, practical values are set to Lo=0.5 m, Δt=0.03 sec. and the maximum sensor displaced amount ΔL is, for example set to ΔL=0.5 m. Then, controllable maximum vehicle speed becomes 120 km/hr to be sufficiently practical. On the other hand, the delay time ΔTf is similarly adjusted in this case to the rear wheel suspension 5' and determined.

The flow then advances to steps S4 and S5 of the flow chart of FIG. 20. Then, the attenuation force variable signal adapted for the roughness information of the road surface is immediately outputted to the front wheel suspension 5. The attenuation force variable signal is delayed by the delay time ΔTr and outputted to the rear wheel suspension 5. Then, in the case where the front wheels 2 and the rear wheels 3 sequentially reach and travel the projection A and the recess B of the road surface, the front and rear wheel suspensions 5, 5' similarly actuate the attenuation to change the suspension characteristics, thereby stably controlling the attitude of the vehicle.

In the case where the road surface sensor 10 detects a flat road surface, the attenuation force variable apparatus 30 is controlled to the characteristics of the third mode which is slightly soft at both the extension and compression sides, thereby improving the riding feel.

As described above, according to this invention, the road surface sensor is provided at the vehicle body and so constituted under the control of the attitude of the vehicle for changing suspension characteristics in response to the rough state of the road surface as to always detect the road surface as near as the vehicle axle by the road surface sensor. Therefore, the road surface can be accurately detected in the state of less influence of pitching of the vehicle, and the control accuracy is also improved. The delay time is adjusted or the sensor displaced amount is adjusted to the sensor mounted position and the delay time of the whole control system in the front wheel suspension to control to input the attenuation force variable signal, and hence the characteristics of the suspension can be suitably changed in a wide vehicle speed range.

Since the rear wheel suspension is so controlled as to input the attenuation force variable signal by delaying at the delay time considered for the wheel base in a whole vehicle speed range, the suspension characteristics can be reliably changed next to the front wheel on the same roughness surface. The rear wheel suspension is separately controlled thereby to process the case where the roughnesses occur in a short period, thereby providing high utility.

What is claimed is:

1. A suspension control system for a vehicle comprising:
   a vehicle body and a plurality of vehicle wheels, a suspension interposed between said body and said wheels,
   a vehicle speed sensor mounted on said vehicle for detecting a speed of said wheels and for generating a vehicle speed signal,
   a shock absorber with a spring and a variable attenuation system, and an actuator provided in said shock absorber for controlling an attenuation force,
   a road surface sensor mounted under a front side of said vehicle body for detecting roughness of a road surface in front of each of said wheels and for producing a road surface condition signal;
   a displacement apparatus connected to said road surface sensor for forwardly and rearwardly moving said road surface sensor;
   an angular displacement apparatus engaged with said displacement apparatus for rotatably changing an angle of said road surface sensor against said road surface; and
   control means responsive to said vehicle speed signal and said road surface condition signal for processing and outputting an actuating signal selectively to said displacement apparatus and said angular displacement apparatus without delay and for generating an adjusted attenuation signal so as to enable an optimum control of said suspension and a stable attitude control of said vehicle in any driving condition.

2. The suspension control system according to claim 1, wherein
   said control means produces said actuating signal to direct said road surface sensor in a perpendicular direction against said road surface in a shortest length of said displacement apparatus and said attenuation signal to adjust a delay time depending on a predetermined delay time of the whole control system when said vehicle speed is low;
   said control means produces said actuating signal to direct said road surface sensor in a perpendicular direction against said road surface and to horizontally and forwardly move said road surface sensor and said attenuation signal without delay depending on said vehicle speed and said predetermined delay time of the whole control system when said vehicle speed is intermediate; and
   said control means produces said actuating signal to direct said road surface sensor in an inclined angle against said road surface in a longest length of said displacement apparatus and said attenuation signal to adjust said delay time depending on said predetermined delay time of the whole control system at said inclined angle when said vehicle speed is high.

3. The suspension control system according to claim 1 further comprising:
   a rail suspended from a fender apron of said vehicle body via a bracket;
   a motor connected to said rail for linear movement thereof in forward and rearward directions; and
   said road surface sensor is fixed at a front end of said rail for detecting roughness of a road surface.

4. The suspension control system according to claim 1, further comprising:
   a rail suspended from a fender apron of said vehicle body via a bracket;
   a motor connected to said rail for circular movement thereof in forward and rearward directions; and
   said road surface sensor is fixed at a front end of said rail for detecting roughness of a road surface.

5. The suspension control system according to claim 1, further comprising:
   a rail suspended from a fender apron of said vehicle body via a bracket;
   a motor connected to said rail for linear movement thereof in forward and rearward directions; and
   said road surface sensor is installed to change an angle against said road surface at a front end of said rail for detecting roughness of a road surface.

6. The suspension control system according to claim 1, further comprising:
   a rail suspended from a fender apron of said vehicle body via a bracket;
   a motor connected to said rail for circular movement thereof in forward and rearward directions; and
   said road surface sensor is installed to change an angle against said road surface at a front end of said rail for detecting roughness of a road surface.

* * * * *